United States Patent
Yamada et al.

(10) Patent No.: US 12,021,681 B2
(45) Date of Patent: Jun. 25, 2024

(54) COMMUNICATION DEVICE, SURVEILLANCE SERVER, AND LOG COLLECTION METHOD

(71) Applicant: Hitachi Industrial Equipment Systems Co., Ltd., Tokyo (JP)

(72) Inventors: Hiroki Yamada, Tokyo (JP); Ryo Nakano, Tokyo (JP); Ryosuke Fujiwara, Tokyo (JP); Kazuto Shirane, Tokyo (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 0 days.

(21) Appl. No.: 17/797,164

(22) PCT Filed: Jan. 13, 2021

(86) PCT No.: PCT/JP2021/000808
§ 371 (c)(1),
(2) Date: Aug. 3, 2022

(87) PCT Pub. No.: WO2021/157299
PCT Pub. Date: Aug. 12, 2021

(65) Prior Publication Data
US 2023/0047615 A1 Feb. 16, 2023

(30) Foreign Application Priority Data
Feb. 4, 2020 (JP) .................. 2020-016744

(51) Int. Cl.
*H04L 41/0659* (2022.01)
*H04L 41/0681* (2022.01)
*H04L 41/069* (2022.01)

(52) U.S. Cl.
CPC ...... *H04L 41/0661* (2023.05); *H04L 41/0681* (2013.01); *H04L 41/069* (2013.01)

(58) Field of Classification Search
CPC ............ H04L 41/0661; H04L 41/0681; H04L 41/069; H04L 41/0677
(Continued)

(56) References Cited

U.S. PATENT DOCUMENTS 10,560,309 B1 * 2/2020 Chitalia .................. H04L 41/40
2009/0320136 A1 12/2009 Lambert et al.
(Continued)

FOREIGN PATENT DOCUMENTS

JP 2012-198796 A 10/2012
JP 2015-121968 A 7/2015
(Continued)

OTHER PUBLICATIONS

International Search Report (PCT/ISA/210) issued in PCT Application No. PCT/JP2021/000808 dated Apr. 13, 2021 with English translation (four (4) pages).
(Continued)

*Primary Examiner* — Karen C Tang
(74) *Attorney, Agent, or Firm* — Crowell & Moring LLP

(57) ABSTRACT

It is provided a communication device which transfers a signal, comprising: an arithmetic device configured to execute predetermined processing; a storage device accessible from the arithmetic device; a log collection module configured to collect first type logs from at least one of the communication device or an equipment coupled to the communication device; an alert generation module configured to generate alert when one of the collected the first type logs satisfies a predetermined condition; and a failure cause candidate determination module configured to determine failure cause candidates in response to the generated alert, and output, to the log collection module, an additional log collection request for collecting second type logs in an
(Continued)

| ALERT NAME | FAILURE CAUSE | FAILURE TYPE | OCCURRENCE COUNT | COLLECTED LOG | QUALIFICATION CONDITION |
|---|---|---|---|---|---|
| OOO | a-1 | HARDWARE | 2 | VOLTAGE | < 5V |
| OOO | a-2 | SOFTWARE | 0 | CPU UTILIZATION RATE | > 95% |
| XXX | b-1 | WIRELESS | 5 | RSSI | < -110 |
| XXX | b-2 | WIRELESS | 3 | BER | > 0.1 |
| XXX | b-3 | WIRELESS | 2 | PER | < 0.7 |
| ... | ... | ... | ... | ... | ... |

501 502 503 504 505 506  203 additional log collection order that is set based on the determined failure cause candidates.

11 Claims, 21 Drawing Sheets

(58) Field of Classification Search
USPC .......................................................... 709/224
See application file for complete search history.

(56) References Cited

U.S. PATENT DOCUMENTS

| | | | |
|---|---|---|---|
| 2020/0184355 A1* | 6/2020 | Mehta | G06F 11/3476 |
| 2020/0272923 A1* | 8/2020 | Banerjee | G06N 7/01 |
| 2021/0328861 A1* | 10/2021 | Oda | H04L 43/50 |

FOREIGN PATENT DOCUMENTS

| | | |
|---|---|---|
| JP | 2017-98870 A | 6/2017 |
| JP | 2019-28878 A | 2/2019 |

OTHER PUBLICATIONS

Japanese-language Written Opinion (PCT/ISA/237) issued in PCT Application No. PCT/JP2021/000808 dated Apr. 13, 2021 (three (3) pages).
Extended European Search Report issued in European Application No. 21750870.4 dated Jan. 26, 2024 (8 pages).

* cited by examiner

| 301 | 302 | 303 | 304 | 201 |
|---|---|---|---|---|
| LOG NUMBER | LOG NAME | COLLECTION CYCLE | COLLECTION FLAG | |
| 1 | LAN_ping_alive | 1h | 1 | |
| 2 | WAN_ping_alive | 1h | 1 | |
| ... | ... | ... | ... | |

| 401 | 402 | 403 | 404 | 405 | 406 |
|---|---|---|---|---|---|
| ALERT NUMBER | ALERT NAME | REFERENCE LOG | CONDITION | CHECK CYCLE | ALERT FLAG |
| 1 | LAN ping dead | LAN_ping_alive | == 0 | 2h | 1 |
| 2 | WAN ping dead | WAN_ping_alive | == 0 | 2h | 1 |
| ... | ... | ... | ... | ... | ... |

Fig. 4

| 501 | 502 | 503 | 504 | 505 | 506 |
|---|---|---|---|---|---|
| ALERT NAME | FAILURE CAUSE | FAILURE TYPE | OCCURRENCE COUNT | COLLECTED LOG | QUALIFICATION CONDITION |
| OOO | a-1 | HARDWARE | 2 | VOLTAGE | < 5V |
| OOO | a-2 | SOFTWARE | 0 | CPU UTILIZATION RATE | > 95% |
| XXX | b-1 | WIRELESS | 5 | RSSI | < -110 |
| XXX | b-2 | WIRELESS | 3 | BER | > 0.1 |
| XXX | b-3 | WIRELESS | 2 | PER | < 0.7 |
| ... | ... | ... | ... | ... | ... |

Fig. 5

| 601 | 602 |
|---|---|
| PRIORITY LEVEL | FAILURE TYPE |
| 1 | HARDWARE |
| 2 | SOFTWARE |
| ... | ... |

Fig. 6

SETTINGS INFORMATION MANAGEMENT SCREEN

LOG COLLECTION CONDITION [ADD LOG DEFINITION]

| LOG NUMBER | LOG NAME | COLLECTION CYCLE | COLLECTION FLAG |
|---|---|---|---|
| ☒ 1 | MEMORY USAGE AMOUNT | 10min | ☑ |
| ☒ 2 | RSSI | 1min | ☑ |
| ☒ 3 | BER | 1h | ☑ |
| 4 | ▼ | | ENTER |

[+ ADD CONDITION]  [SELECT SETTING FILE]

ALERT CONDITION

| ALERT NUMBER | ALERT NAME | REFERENCE LOG | CONDITION | THRESHOLD VALUE | CHECK CYCLE | CHECK FLAG |
|---|---|---|---|---|---|---|
| ☒ 1 | Mem_denger | MEMORY USAGE AMOUNT | > | 23510 | 10min | ☑ |
| ☒ 2 | Error_increase | BER | > | 0.1 | 1min | ☑ |
| 3 | | ▼ | ▼ | | | ENTER |

[+ ADD CONDITION]  [+ ADD LOG]  [SELECT SETTING FILE]

FAILURE CAUSE CANDIDATE DETERMINATION CONDITION

| No. | FAILURE CAUSE | FAILURE TYPE | ALERT NAME | REFERENCE LOG | CONDITION | THRESHOLD VALUE |
|---|---|---|---|---|---|---|
| ☒ 1 | INTERFERENCE WAVE | WIRELESS | Error_increase | RSSI | > | -70 |
| 2 | | | | BER | > | 0.1 |
| 3 | | ▼ | ▼ | ▼ | ▼ | ENTER |

[+ ADD CONDITION]  [+ ADD ALERT]  [+ ADD LOG]  [SELECT SETTING FILE]

PRIORITY LEVEL

| PRIORITY LEVEL | FAILURE TYPE | |
|---|---|---|
| 1 | ☒ ERRONEOUS SETTINGS | |
| 2 | ☒ HARDWARE | ▢ |
| 3 | ☒ WIRELESS | ▢ |
| 4 | ☒ SOFTWARE | ▢ |

[+ ADD CLASS]  ENTER

[UPDATE SETTINGS]

*Fig. 8*

ADDITIONAL COLLECTION MANAGEMENT SCREEN — 1500

ADDITIONAL COLLECTION MODE
AUTOMATIC CHANGE ▼ — 1501

MODE AUTOMATIC CHANGE CONDITION

| COLLECTION MODE | REFERENCE INFORMATION | DESCENDING ORDER | QUALIFICATION CONDITION | |
|---|---|---|---|---|
| BANDWIDTH PRIORITY | ACQUISITION TIME ▼ | ☐ | TRANSMISSION RATE > 10Mbps | CHANGE CONDITION |
| OPERATION PRIORITY | DATA AMOUNT ▼ — 1502 | ☑ — 1503 | CPU UTILIZATION RATE > 80% | CHANGE CONDITION — 1504 |

[ENTER] — 1506
[+ADD MODE] — 1507
1505

LOG ADDITIONAL COLLECTION AVAILABILITY

| No. | LOG | ACQUISITION TIME | DATA AMOUNT | OPERATION PRIORITY | OPERATION PRIORITY | COLLECTION PROHIBITION CONDITION | |
|---|---|---|---|---|---|---|---|
| 1 | MEMORY USAGE AMOUNT | 10s | 128Byte | ☑ | ☐ | — | CHANGE CONDITION |
| 2 | RSSI | 10s | 4Byte | ☑ | ☑ | WAN = OFF | CHANGE CONDITION |
| 3 | BER | 100s | 4Byte | ☐ | ☑ — 1508 | WAN = OFF — 1509 | CHANGE CONDITION |

[UPDATE SETTINGS]

*Fig. 15A*

COMMUNICATION DEVICE, SURVEILLANCE SERVER, AND LOG COLLECTION METHOD

CLAIM OF PRIORITY

The present application claims priority from Japanese patent application JP 2020-16744 filed on Feb. 4, 2020, the content of which is hereby incorporated by reference into this application.

BACKGROUND OF THE INVENTION

This invention relates to a communication device and a surveillance server which identify a cause of a failure that has occurred.

In a network including a plurality of communication devices, hardware abnormality and software abnormality of the communication device, congestion in a communication line, erroneous network settings, or the like causes a failure which inhibits communication. Accordingly, there has been proposed a method of detecting occurrence of a failure early and identifying a cause of the failure at the same time by periodically collecting logs from communication devices and terminals coupled to the communication devices and thus keeping track of operational statuses.

In recent years, popularization of IoT equipment has brought about diversification of communication devices and networks, and a network that is a mixture of wired and wireless networks is adopted in a field in which wired connection networks have been the mainstream as well. In this case, in addition to a failure occurring in an older wired section, a failure occurring in a wireless section is required to be detected. In view of the diversification of networks and failure causes, there have been proposed technologies for accomplishing detection of a failure and identification of a cause of the failure.

For example, in JP 2012-198796 A, there is described a log collection system including terminal equipment and a server device (see Abstract). The terminal equipment includes log collection and accumulation means for collecting and accumulating log information, abnormality detection means for detecting an abnormal state by analyzing the accumulated log information, and abnormality notification means for notifying, when an abnormal state is detected, the abnormal state to the server device. The server device includes log collection means for collecting the log information accumulated in the terminal equipment, abnormality analysis means for analyzing the notified abnormal state, abnormality detection instruction means for instructing the abnormality detection means to set an abnormality state detection method in accordance with contents of the abnormal state, terminal log collection and accumulation instruction means for instructing the log collection and accumulation means to set granularity and contents of log information to be collected and accumulated as well as frequency of collection and accumulation, and log collection instruction means for instructing the log collection means to set contents and collection frequency of the log information to be collected from the terminal equipment.

In JP 2019-28878 A, there is described an information processing device including: a storage unit which stores, out of operation information including a plurality of log records about components of a predetermined device, for each message, a time range of log records to be extracted and a priority level of each type of the log records; and a processing unit which, when a message is detected, refers to the storage unit and extracts the log records out of the operation information, based on the time range of the message from a current time and the priority level of the message (see claim 1).

SUMMARY OF THE INVENTION

When a failure that has occurred has a potential for a great damage, a cause of the failure is required to be ascertained quickly and efficiently. With the above-mentioned related art, although the efficiency of log collection is improved, the order of identifying causes of a failure is not taken into consideration when log contents to be collected are determined. For example, when a failure in which packets are not transferred occurs and network settings are found to be erroneous after whether there is a software bug is examined, the erroneous settings are corrected and then the presence or absence of a software bug is required to be examined again. In this case, an order in which whether there are erroneous setting is checked and examination on the presence or absence of a software bug is subsequently executed is higher in efficiency. This invention is to enable log collection that accomplishes highly efficient failure cause identification with downtime minimized by determining the order of identifying causes of a failure.

The representative one of inventions disclosed in this application is outlined as follows. There is provided a communication device which transfers a signal, comprising: an arithmetic device configured to execute predetermined processing; a storage device accessible from the arithmetic device; a log collection module configured to collect first type logs from at least one of the communication device or an equipment coupled to the communication device; an alert generation module configured to generate alert when one of the collected first type logs satisfies a predetermined condition; and a failure cause candidate determination module configured to determine failure cause candidates in response to the generated alert, and output, to the log collection module, an additional log collection request for collecting second type logs in an additional log collection order that is set based on the determined failure cause candidates.

According to the at least one aspect of this invention, log collection that accomplishes, in the event of a failure, highly efficient identification of causes of the failure with downtime minimized is enabled. Objects, configurations, and effects other than those described above are revealed in the following description of embodiments.

BRIEF DESCRIPTION OF THE DRAWINGS

FIG. 4 is a diagram for illustrating an example of the alert condition management table according to the first embodiment.

FIG. 5 is a diagram for illustrating an example of the failure cause management table according to the first embodiment.

FIG. 6 is a diagram for illustrating an example of the priority level management table according to the first embodiment.

FIG. 8 is a diagram for illustrating an example of the settings information management screen of the communication device according to t the first embodiment.

FIG. 15A is a diagram for illustrating an example of the additional collection management screen of the communication device according to the second embodiment.

DETAILED DESCRIPTION OF THE PREFERRED EMBODIMENTS

Figure 1:
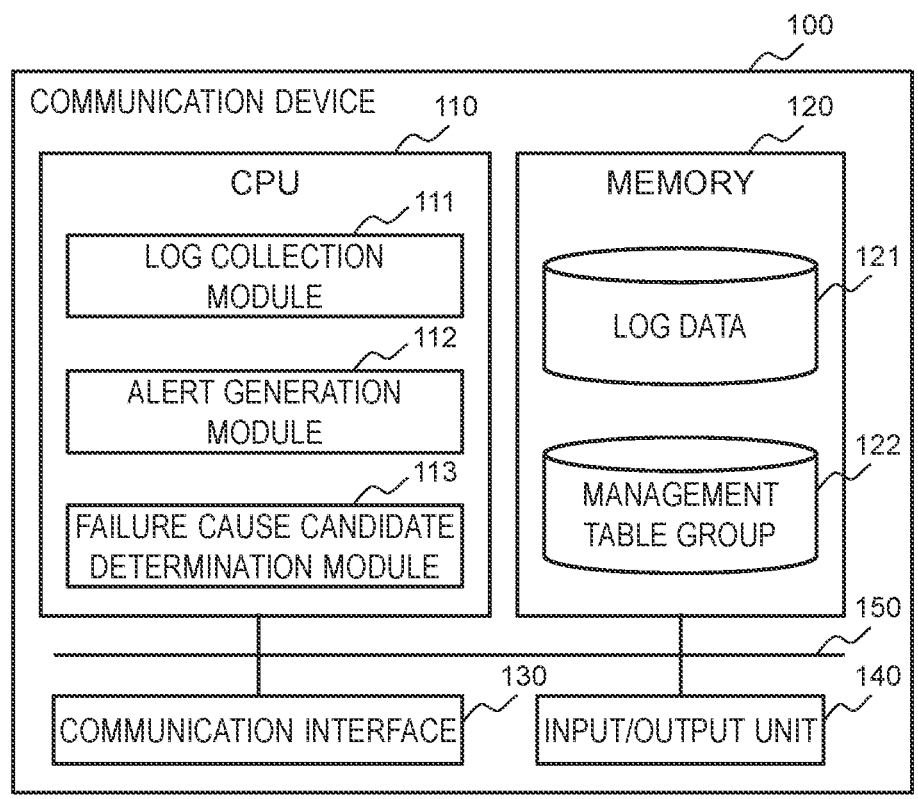
FIG. 1 is a diagram for illustrating an example of a configuration of a communication device according to a first embodiment of this invention.

Now, description is given of embodiments of this invention referring to the drawings. It should be noted that this invention is not to be construed by limiting the invention to the content described in the following embodiments. A person skilled in the art would easily recognize that a specific configuration described in the following embodiments may be changed within the scope of the concept and the gist of this invention.

In configurations of this invention described below, the same or similar components or functions are denoted by the same reference symbols, and a redundant description thereof is omitted here.

First Embodiment

FIG. 1 is a diagram for illustrating an example of a configuration of a communication device according to a first embodiment of this invention.

A communication device 100 according to the first embodiment includes a CPU 110, a memory 120, a communication interface 130, and an input/output unit 140, and those components are coupled to one another via an intra-communication device network 150. The intra-communication device network 150 is not limited to the type and coupling method thereof, and a network of a different type and a different coupling method may couple the components to one another.

The CPU 110 is an arithmetic device which executes programs and, by executing programs, operates as function modules which implement specific functions (a log collection module 111, an alert generation module 112, and a failure cause candidate determination module 113). Some of processing executed by the CPU 110 by executing the programs may be executed by another arithmetic device (for example, hardware such as a field-programmable gate array (FPGA) or an application-specific integrated circuit (ASIC)). In the following description, processing described with a function module as the subject of a sentence is executed by the CPU 110 by executing a program that implements this function module.

The memory 120 is a storage device which stores data required for execution of functions by the communication device 100. The memory 120 stores log data 121, as well as a management table group 122 referred to by the log collection module 111, the alert generation module 112, and the failure cause candidate determination module 113.

The communication interface 130 is an interface for communication of the communication device 100 to and from another device. The communication interface 130 includes, for example, a wireless communication module in which a network interface card (NIC) or a SIM card is loaded.

The input/output unit 140 executes processing of information input from the outside of the communication device 100 via the communication interface 130, processing of storing the input information in the memory 120, and processing of relaying the input information to another component. The input/output unit 140 also executes processing of acquiring information from the components of the communication device 100, and outputting the information to the outside via the communication interface 130.

Figures 2, 3:
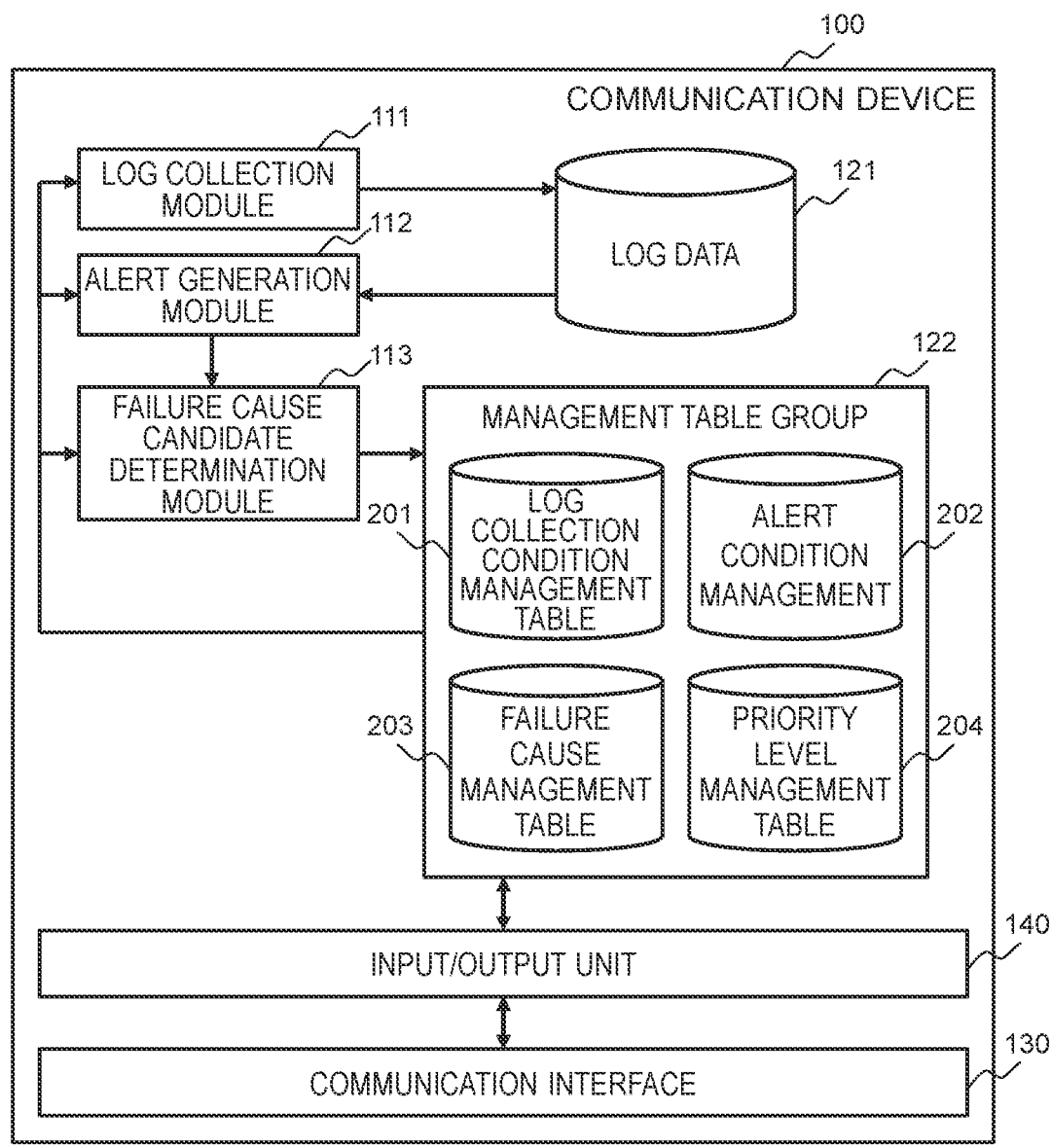
FIG. 2 is a diagram for illustrating an example of input/output between the components of the communication device according to the first embodiment.
FIG. 3 is a diagram for illustrating an example of the log collection condition management table according to the first embodiment.

FIG. 2 is a diagram for illustrating an example of input/output between the components of the communication device 100 according to the first embodiment.

The management table group 122 includes a log collection condition management table 201, an alert condition management table 202, a failure cause management table 203, and a priority level management table 204.

The log collection module 111 refers to the log collection condition management table 201 to collect logs from the communication device 100 and from equipment coupled to the communication device 100 via the communication interface 130, and stores the logs as log data 121.

The alert generation module 112 refers to the alert condition management table 202 and the log data 121 to generate alert when the log data 121 satisfies an alert generation condition of the alert condition management table 202, and notifies the failure cause candidate determination module 113 of the alert.

The failure cause candidate determination module 113 is notified of the alert by the alert generation module 112, and refers to the failure cause management table 203 and the priority level management table 204 to determine failure cause candidates and determine priority levels based on failure types. The failure cause candidate determination module 113 further updates the log collection condition management table 201, the alert condition management table 202, and the failure cause management table 203 based on the determined failure cause candidates.

Details of the management table group 122 referred to by the function modules are described below. Elements included in the management table group 122 are an example, and the management table group 122 is not required to include some of elements described below and may include other elements.

FIG. 3 is a diagram for illustrating an example of the log collection condition management table 201.

In the log collection condition management table 201, a log number 301, a log name 302, a collection cycle 303, and a collection flag 304 are recorded. A number for identifying a log is written as the log number 301. A name for identifying the log is written as the log name 302. A cycle in which the log is collected is written as the collection cycle 303. A flag for controlling whether to collect the log of the current row is recorded as the collection flag 304. For example, when "1" is written in a column of the collection flag 304, the log collection module 111 collects the log of that row in the collection cycle 303. When "0" is written in the column of the collection flag 304, on the other hand, the log collection module 111 does not collect a log of that row.

FIG. 4 is a diagram for illustrating an example of the alert condition management table 202.

In the alert condition management table 202, an alert number 401, an alert name 402, a reference log 403, a condition 404, a check cycle 405, and an alert flag 406 are recorded. A number for identifying an alert is written as the alert number 401. A name for identifying the alert is written as the alert name 402. A cycle in which an alert condition is examined is written as the check cycle 405. A flag for controlling whether to examine the alert condition of that row is recorded as the alert flag 406. For example, when "1" is written in a column of the alert flag 406, the alert generation module 112 examines an alert condition of that row in the check cycle 405, and generates alert when the alert condition is satisfied. When "0" is written in the column of the alert flag 406, on the other hand, the alert generation module 112 does not examine an alert condition of that row.

FIG. 5 is a diagram for illustrating an example of the failure cause management table 203.

In the failure cause management table 203, an alert name 501, a failure cause 502, a failure type 503, an occurrence count 504, a collected log 505, and a qualification condition 506 are written. A name taken from the alert name 402 of the alert condition management table 202 is written as the alert name 501, and a name for distinguishing a failure cause is written as the failure cause 502. One of types created by classifying failure causes, for example, hardware, software, wireless, or erroneous settings, is written as the failure type 503. An accumulated number of times that failure cause has been determined to be a candidate is written as the occurrence count 504. The log name 302 required to identify the failure cause 502 of that row is written as the collected log 505. A condition of the collected log 505 of that row in which the failure cause 502 is inferred to have occurred and is determined to be a failure cause candidate is written as the qualification condition 506, with the use of, for example, a greater-than sign, a less-than sign, an equality sign, or an inequality sign along with a threshold value or the like.

FIG. 6 is a diagram for illustrating an example of the priority level management table 204.

In the priority level management table 204, a priority level 601 and a failure type 602 are written. A priority level of the failure type 602 written in that row is written as the priority level 601. One of the types created by classifying failure causes is written as the failure type 602. The failure type 602 is a failure type taken from the failure type 503 of the failure cause management table 203.

Processing executed by the failure cause candidate determination module 113 in the first embodiment is described below with reference to FIG. 7A and FIG. 7B.

Figure 7A:
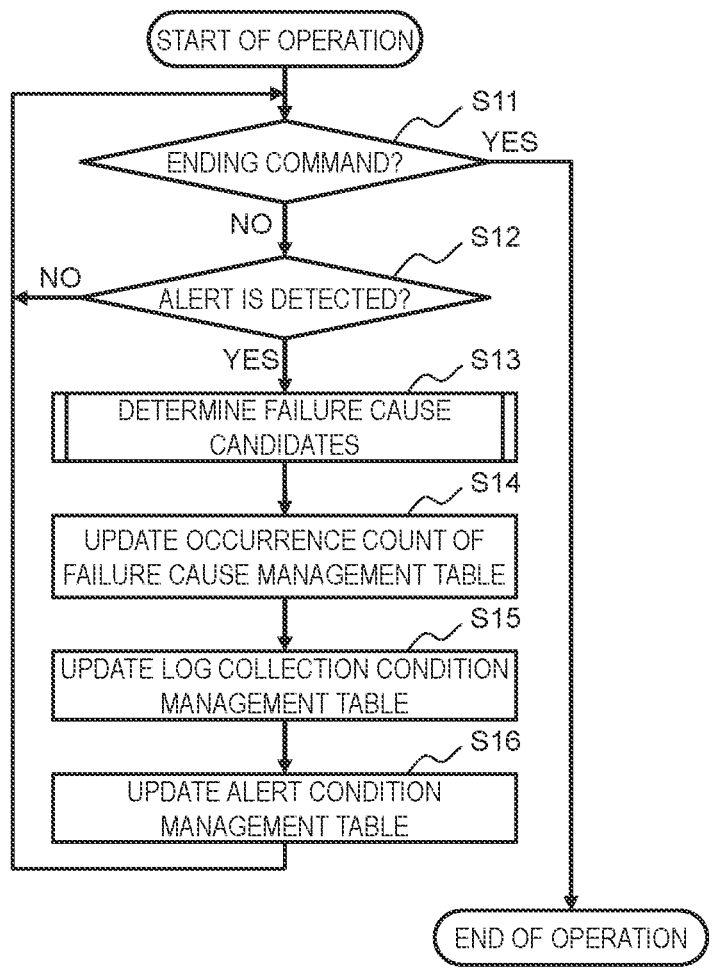
FIG. 7A is a flow chart of failure cause candidate determination processing executed by the failure cause candidate determination module according to t the first embodiment.
Figure 7B:
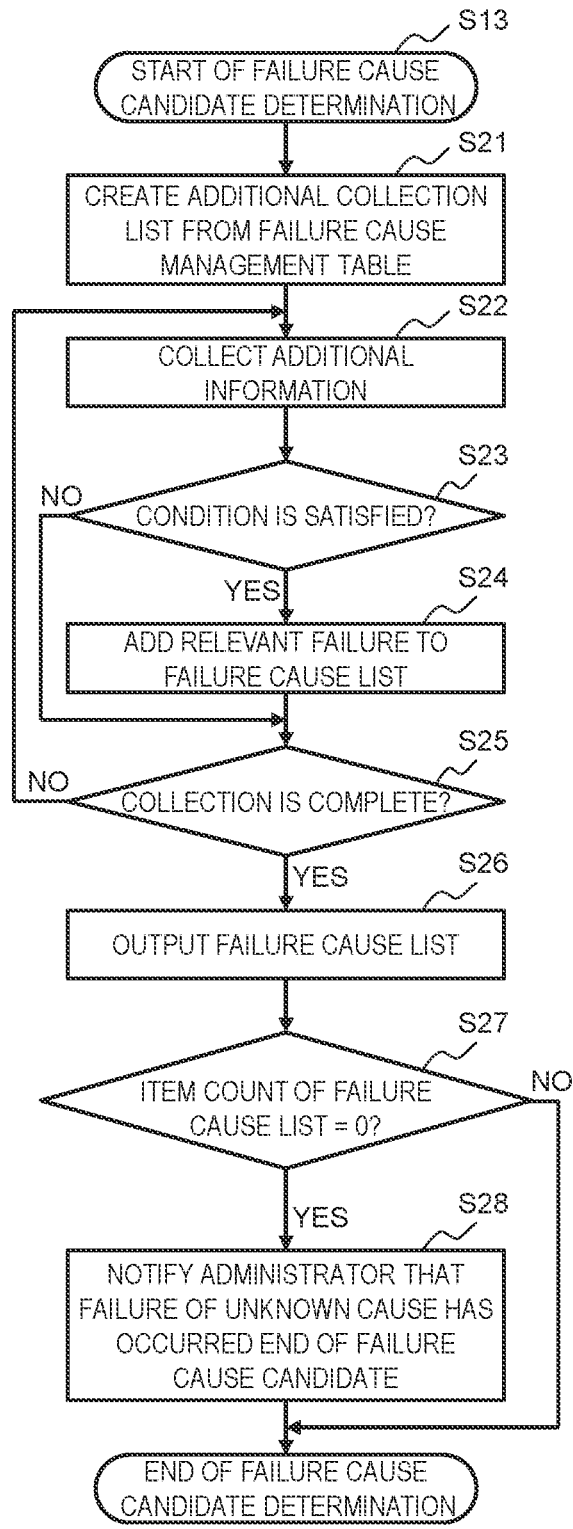
FIG. 7B is a flow chart of detail of failure cause candidate determination processing executed by the failure cause candidate determination module according to t the first embodiment.

FIG. 7A is a flow chart of failure cause candidate determination processing executed by the failure cause candidate determination module 113 according to the first embodiment. Once starting operation, the failure cause candidate determination module 113 executes the following steps.

Step S11: Whether an ending instruction has been input to the input/output unit 140 is determined. When it is determined that an ending instruction has been input, the operation ends. When it is determined that an ending instruction has not been input, the process proceeds to Step S12.

Step S12: Whether the alert generation module 112 has generated alert is determined. When it is determined that alert has been generated, the process proceeds to Step S13. When it is determined that alert has not been generated, the process returns to Step S11.

Step S13: Failure cause candidates are determined and priority levels based on the failure types are determined by referring to the alert generated by the alert generation module 112, the failure cause management table 203, and the priority level management table 204. Detailed processing of determining failure cause candidates is described later in processing steps of from Step S21 to Step S28.

Step S14: In each of rows of the failure cause management table 203 that are related to the failure cause candidates determined in Step S13, 1 is added to the value of the occurrence count 504.

Step S15: The log collection condition management table 201 is referred to, and information of logs related to the failure cause candidates determined in Step S13 is updated. For example, in a row of the log collection condition management table 201 in which the log name 302 of the log collection condition management table 201 matches the collected log 505 of a row of the failure cause management table 203 that is related to the failure cause 502 determined to be a candidate, table update processing in which the collection cycle 303 is changed to a minimum time and the collection flag 304 is changed from 0 to 1 when the collection flag 304 is 0 may be executed.

Step S16: The alert condition management table 202 is referred to, and information of alert related to the failure cause candidates determined in Step S13 is updated. For example, in a row of the alert condition management table 202 in which the alert name 402 matches the alert name 501 of a row of the failure cause management table 203 that is related to the failure cause 502 determined to be a candidate, the check cycle 405 may be changed to a minimum time.

Next, detailed processing of the failure cause candidate determination (Step S13) is described with reference to FIG. 7B. The failure cause candidate determination module 113 executes the following steps in the failure cause candidate determination (Step S13).

Step S21: The failure cause management table 203 is referred to, and a row in which the alert name 501 matches the alert name 402 of alert detected to have been generated in Step S12 is extracted. The priority level management table 204 and the failure type 503 of the extracted row are referred to, and the collected log 505 in a row of the failure type 503 high in priority level is added to an additional collection list. For example, when the priority level 601 of hardware written as the failure type 602 is 1 and the priority level 601 of software written as the failure type 602 is 2 in the priority level management table 204, extracted rows are referred to in order from the top downwards, and the collected log 505 may be added to the additional collection list when "hardware" is written as the failure type 503 in the first of the extracted rows. In this manner, the order of logs to be additionally collected is determined in accordance with the priority level 601. This operation is repeated until the last of the extracted rows is reached, and then returns to the top. Next, when "software" is written as the failure type 503, the failure cause 502 and the collected log 505 are added to the bottom of the additional collection list. The additional collection list is a list in which the failure cause 502 and the collected log 505 are written as elements of a row. When there is an item to be added but no additional collection list, the additional collection list is created.

Step S22: One row of information of the additional collection list created in Step S21 is read, and the collected log 505 written therein is collected. For example, rows in which the occurrence count 504 is high are preferentially read. This sets the order of additionally collected logs so that failures that have frequently occurred in the past are given priority. Rows in which the priority level 601 is low may be ignored.

Step S23: Whether the collected log 505 collected in Step S22 satisfies the qualification condition 506 is determined. When the qualification condition 506 is satisfied, the process proceeds to Step S24. When the qualification condition 506 is not satisfied, the process proceeds to Step S25.

Step S24: The failure cause 502 of the row of the additional collection list that has been read in Step S22 is added to the bottom of a failure cause list. The failure cause list is a list of failure causes each written as the failure cause 502. When there is an item to be added but no failure cause list, the failure cause list is created.

Step S25: The row of the additional collection list that has been read in Step S22 is referred to. When the read row is at the bottom of the additional collection list, the process proceeds to Step S26. When the read row is not at the bottom of the additional collection list, the process returns to Step S22.

Step S26: The failure cause list created between Step S22 and Step S26 is transmitted to the input/output unit 140. The input/output unit 140 outputs the failure cause list via the communication interface 130. For example, the input/output unit 140 may create an email in which the failure cause list is written, and transmit the email to an email address of an administrator. The input/output unit 140 may also create a screen to be displayed when the communication device 100 is accessed from a browser of a terminal coupled via network to the communication device 100, and display the failure cause list on the screen. This invention is not to be interpreted as being limited to the above-mentioned methods of outputting the failure cause list.

Step S27: When the number of items on the failure cause list created between Step S22 and Step S26 is 0, failure cause candidates cannot be determined, and the process accordingly proceeds to Step S28. When the number of items on the failure cause list is 1 or more, the failure cause candidate determination processing (Step S13) is ended.

Step S28: The input/output unit 140 is instructed to notify the administrator, and the administrator is notified via the input/output unit 140 that a failure of unknown cause has occurred. For example, the input/output unit 140 may create an email in which a fixed message to the effect that a failure of unknown cause has occurred is written, and transmit the email to the email address of the administrator via the communication interface 130. The input/output unit 140 may also create a screen to be displayed when access from a browser of a terminal coupled via network takes places, and display an error message to the effect that a failure of unknown cause has occurred on the screen. This invention is not to be interpreted as being limited to the above-mentioned methods of communication.

The following description is about a settings information management screen 800 displayed by the input/output unit 140 when a terminal coupled to the communication device 100 via a network accesses the communication device 100 via a browser. This invention is not to be interpreted as being limited to contents of display and contents of operation on the settings information management screen 800 described below.

FIG. 8 is a diagram for illustrating an example of the settings information management screen 800 of the communication device 100.

The input/output unit 140 refers to the management table group 122 to create the settings information management screen 800. The settings information management screen 800 displays contents recorded in the log collection condition management table 201, the alert condition management table 202, the failure cause management table 203, and the priority level management table 204.

The contents of the log collection condition management table 201 are displayed as one log collection condition in one row by associating the items of the log collection condition management table 201, which are the log number 301, the log name 302, the collection cycle 303, and the collection flag 304, with one another.

The contents of the alert condition management table 202 are displayed as one alert condition in one row by associating the items of the alert condition management table 202, which are the alert number 401, the alert name 402, the reference log 403, the check cycle 405, and the alert flag 406, with one another. The condition 404 is displayed by being divided into a condition and a threshold value.

The contents of the failure cause management table 203 are displayed as one failure cause candidate determination condition in one row by associating the items of the failure cause management table 203, which are the alert name 501, the failure cause 502, the failure type 503, and the collected log 505, with one another. The qualification condition 506 is displayed by being divided into a condition and a threshold value.

The contents of the priority level management table 204 are displayed as one priority level in one row by associating the items of the priority level management table 204, which are the priority level 601 and the failure type 602, with each other.

Operation on the settings information management screen 800 is described below.

A checkbox 810 of the collection flag is a checkbox operated in order to display and change a state of the collection flag 304 written in each row of log collection condition. When the collection flag 304 of the log collection condition management table 201 is "1" at the time of generation of the settings information management screen 800, the displayed checkbox is checked. When the collection flag 304 is "0" at that time, the displayed checkbox is unchecked. The collection flag 304 can be updated to 1 by checking the checkbox 810 on the screen, and to 0 by unchecking the checkbox 810.

A log collection condition can newly be defined by selecting the registered log name 302 in a log name input field 811 on the settings information management screen 800, inputting a collection cycle in a collection cycle input field 812, and then operating an enter button 813.

One new item can be displayed for each of the log name input field 811, the collection cycle input field 812, and the enter button 813 by operating a condition addition button 814.

A condition deletion box 815 is a button operated to delete a log collection condition, and can be used to delete a log collection condition of a selected row.

A screen for selecting a file can be displayed by operating a setting file selection button 820. On the screen for selecting a file, a file in which the log name 302, the collection cycle 303, and the collection flag 304 are organized into a list format can be selected to define a plurality of log collection conditions.

A log definition addition button 821 is a button operated in order to newly define a log, and can be used to increase logs selectable in the log input field 811 by newly defining a log. For example, a screen on which the log name 302, a program for acquiring a log, and a file path of a script can be input is displayed by operating the log definition addition button 821, and a log is newly defined based on the input.

A checkbox 830 is a checkbox operated in order to display and change a state of the alert flag 406 of alert written in each row. When the alert flag 406 of the alert condition management table 202 is "1" at the time of generation of the settings information management screen 800, the displayed checkbox is checked. When the alert flag 406 is "0" at that time, the displayed checkbox is unchecked. The alert flag 406 can be updated to 1 by checking the checkbox 830 on the screen, and to 0 by unchecking the checkbox 830.

An alert condition can newly be defined by inputting an alert name in an alert name input field 831 on the settings information management screen 800, selecting the log name 302 in a reference log input field 832, selecting a greater-than sign, a less-than sign, an equality sign, an inequality sign, or the like in a condition input field 833, inputting a threshold value in a threshold value input field 834, inputting a cycle in a check cycle input field 835, and then operating an enter button 836.

A log addition button 837 is used to associate one alert name input field 831 with more than one reference log input field 832, more than one condition input field 833, and more than one threshold value input field 834. In other words, one new item is displayed for each of the reference log input field 832, the condition input field 833, and the threshold value input field 834 by operating the log addition button 837.

One new item is displayed for each of the alert name input field 831, the reference log input field 832, the condition input field 833, the threshold value input field 834, the check cycle input field 835, and the enter button 836 by operating a condition addition button 838.

A condition deletion box 839 is a button operated to delete an alert condition, and can be used to delete an alert condition of a selected row.

A screen for selecting a file can be displayed by operating a setting file selection button 840. On the screen for selecting a file, a file in which the alert number 401, the alert name 402, the reference log 403, the condition 404, the check cycle 405, and the alert flag 406 are organized into a list format can be selected to define a plurality of alert conditions.

A failure cause candidate determination condition can newly be defined by inputting a failure cause in a failure cause input field 851 on the settings information management screen 800, selecting the failure type 503 in a failure type input field 852, selecting the alert name 402 in an alert name input field 853, selecting the log name 302 in a reference log input field 854, selecting a greater-than sign, a less-than sign, an equality sign, an inequality sign, or the like in a condition input field 855, inputting a threshold value in a threshold value input field 856, and then operating an enter button 857.

An alert addition button 858 is used to associate one failure type input field 852 with more than one alert name input field 853. In other words, one new item is displayed for the alert name input field 853 by operating the alert addition button 858.

A log addition button 859 is used to associate one failure type input field 852 with more than one reference log input field 854, more than one condition input field 855, and more than one threshold value input field 856. In other words, one new item is displayed for each of the reference log input field 854, the condition input field 855, and the threshold value input field 856 by operating the log addition button 859.

One new item is displayed for each of the failure cause input field 851, the failure type input field 852, the alert name input field 853, the reference log input field 854, the condition input field 855, and the threshold value input field 856 by operating a condition addition button 860.

A condition deletion box 861 is a button operated to delete a failure cause candidate determination condition, and can be used to delete a failure cause candidate determination condition of a selected row.

A screen for selecting a file can be displayed by operating a setting file selection button 870. On the screen for selecting a file, a file in which the alert name 501, the failure cause 502, the failure type 503, the collected log 505, and the qualification condition 506 are organized into a list format can be selected to define a plurality of failure cause candidate determination conditions.

A failure type can newly be defined by inputting the failure type 503 in a failure type input field 881 on the settings information management screen 800 and then operating an enter button 882.

One new item can be displayed for each of the failure type input field 881 and the enter button 882 by operating a class addition button 883.

A type deletion box 884 is a button operated in order to delete the failure type 503, and can be used to delete the failure type 503 of a selected row.

A priority raising button 885 of a row can be operated to raise the priority level 601 of the failure type 503 of that row by one priority level.

When a settings update button 890 is operated, the input/output unit 140 updates the management table group 122 in accordance with the settings information displayed on the settings information management screen 800.

As described above, according to the first embodiment, log collection that accomplishes highly efficient failure cause identification with downtime minimized is enabled by determining failure cause candidates from alert and determining an order in which the determined failure cause candidates are examined. In addition, log collection conditions and alert generation conditions can be updated to suit the determined failure cause candidates in consideration of a case in which continuous collection of logs are required when a failure occurs and a case in which alert is required to be continuously monitored.

The order of examining the failure cause candidates may be determined in advance, or may dynamically be determined based on the failure type or on a failure history about the frequency of failure occurrence or the like. A user can set those settings and check contents of the settings through the settings information management screen 800 or other measures.

In the first embodiment, log collection conditions, alert generation conditions, failure cause candidate determination conditions, and priority levels are managed in tables for the purpose of description. However, the conditions and the priority levels may be held within software, and effects of the first embodiment can be obtained regardless of management measures of the conditions and the priority levels.

Second Embodiment

A second embodiment of this invention uses different processing steps in failure cause identification. In the second embodiment, a function of setting collection prohibition conditions so as not to hinder operation of the communication device when logs are collected for failure cause identification, and a function of determining whether logs are allowed to be collected in accordance with requirements demanded by a user, are added. The following description of the second embodiment is centered around differences from the first embodiment. In the second embodiment, components and functions that are the same as those in the first embodiment are denoted by the same reference symbols, and descriptions thereof are omitted.

Figure 9:
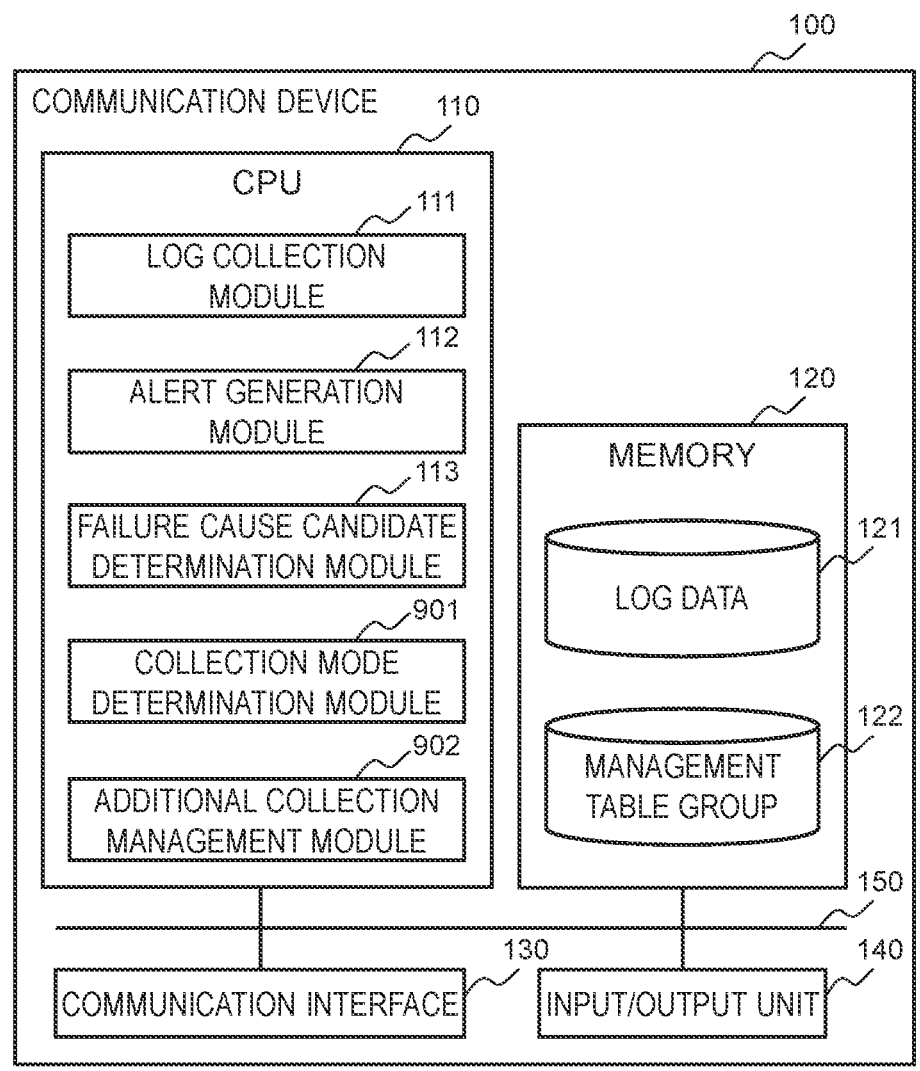
FIG. 9 is a diagram for illustrating an example of a configuration of a communication device according to a second embodiment.

FIG. 9 is a diagram for illustrating an example of a configuration of a communication device 100 according to the second embodiment.

The communication device 100 according to the second embodiment includes the CPU 110, the memory 120, the communication interface 130, and the input/output unit 140, and those components are coupled to one another via the intra-communication device network 150.

The CPU 110 is an arithmetic device which executes programs and, by executing programs, operates as function modules which implement specific functions (the log collection module 111, the alert generation module 112, the failure cause candidate determination module 113, a collection mode determination module 901, and an additional collection management module 902). Some of processing executed by the CPU 110 by executing the programs may be executed by another arithmetic device (for example, hardware such as a field-programmable gate array (FPGA) or an application-specific integrated circuit (ASIC)). In the following description, processing described with a function module as the subject of a sentence is executed by the CPU 110 by executing a program that implements this function module.

Figure 10:
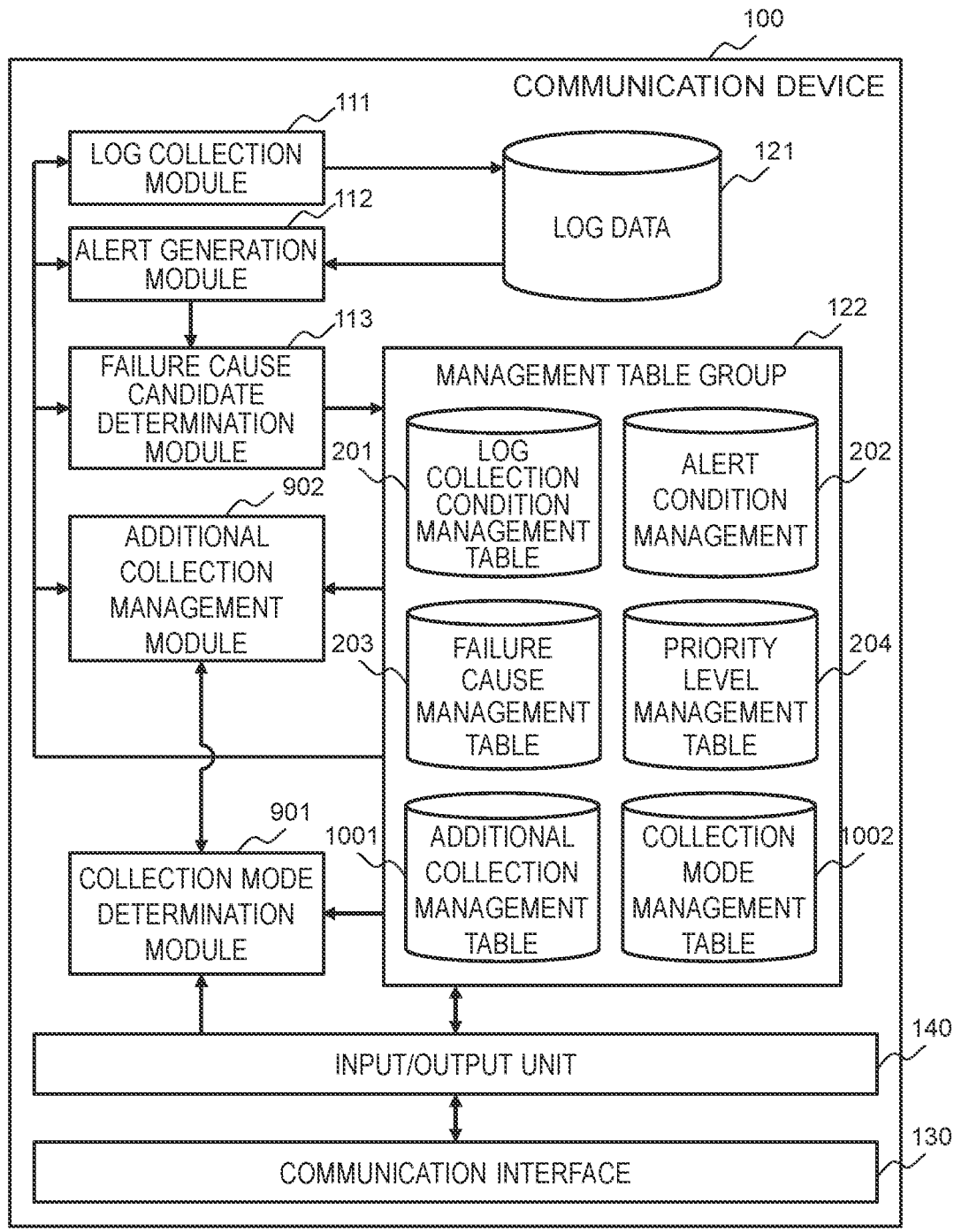
FIG. 10 is a diagram for illustrating an example of input/output between the components of the communication device according to the second embodiment.

FIG. 10 is a diagram for illustrating an example of input/output between the components of the communication device 100 according to the second embodiment. The management table group 122 includes the log collection condition management table 201, the alert condition management table 202, the failure cause management table 203, the priority level management table 204, an additional collection management table 1001, and a collection mode management table 1002.

The collection mode determination module 901 determines a collection mode which determines a trend of collection in identification of a failure cause. Examples of the collection mode include a mode in which collection of a log that takes time to collect is stopped in order to give priority to operation of the communication device, and a mode in which collection of a log large in data amount is suppressed in order to save a communication bandwidth. Which collection mode to use can be determined by input received from the communication interface 130 via the input/output unit 140, or by a qualification condition 1202 written for each collection mode in the collection mode management table 1002.

The additional collection management module 902 responds to an inquiry issued by the failure cause candidate determination module 113 in identification of a failure cause, by referring to log information 1102, additional collection availability 1103, and a collection prohibition condition 1104 of the additional collection management table 1001, and returning a corrected additional collection list. To deal with the inquiry, the additional collection management module 902 issues an inquiry about the collection mode to the collection mode determination module 901.

Figure 11:
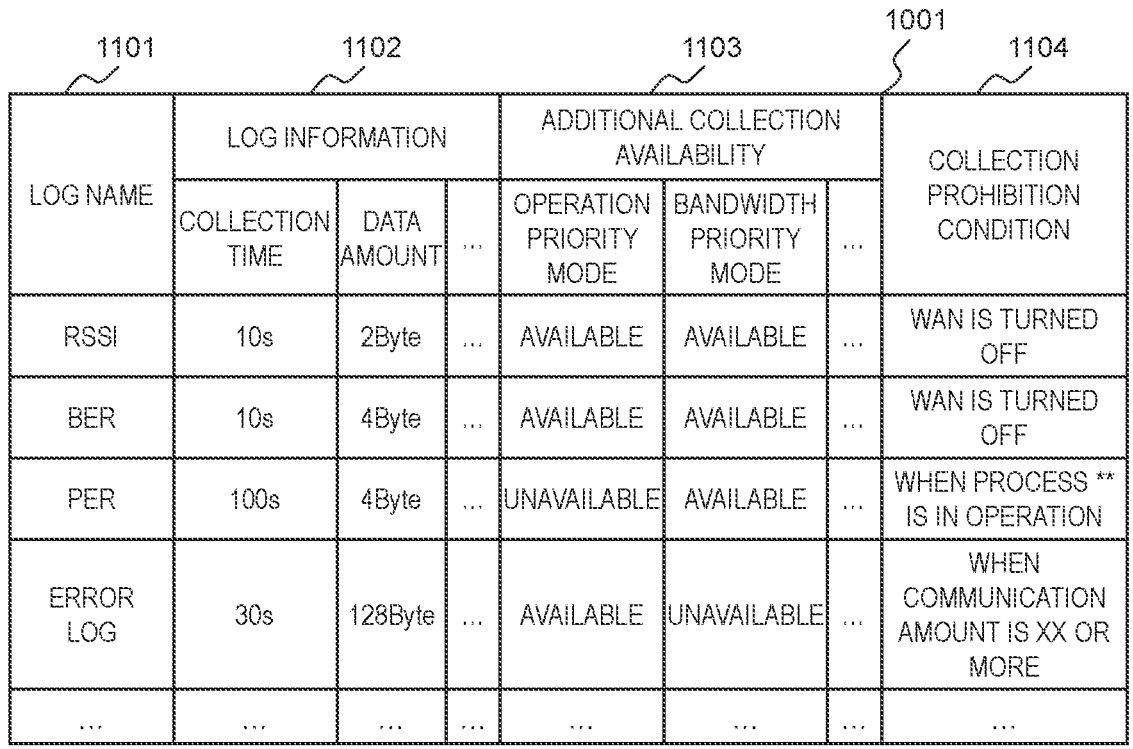
FIG. 11 is a diagram for illustrating an example of the additional collection management table according to the second embodiment.

FIG. 11 is a diagram for illustrating an example of the additional collection management table 1001.

In the additional collection management table 1001, a log name 1101, the log information 1102, the additional collection availability 1103, and the collection prohibition condition 1104 are written. The log name 1101 is the same as the log name 302, and is taken from the log name 302 written in the log collection condition management table 201. Log-by-log information, for example, a collection time required to collect or a data amount of the log to be collected is written as the log information 1102. Whether collection is allowed in a collection mode determined by the collection mode determination module 901 is written for each log separately as the additional collection availability 1103. A condition for prohibiting collection which is determined for each log separately is written as the collection prohibition condition 1104. Examples of the condition include prohibition of collection of information about a wide area network (WAN) when connection to the WAN is not established, and prohibition of collection of a log that requires a long collection time when an important process is in progress.

Figure 12:
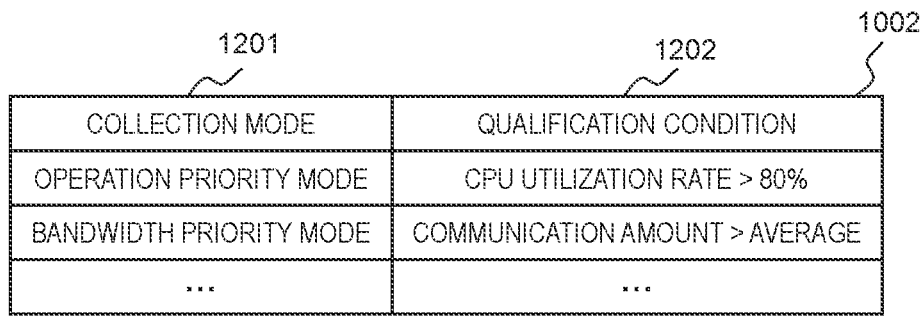
FIG. 12 is a diagram for illustrating an example of the collection mode management table according to the second embodiment.

FIG. 12 is a diagram for illustrating an example of the collection mode management table 1002.

In the collection mode management table 1002, a collection mode 1201 and the qualification condition 1202 are written. It is recommended to prepare a default mode to be applied in normal times, in addition to the collection modes written in the collection mode management table 1002. A name of a collection mode is written as the collection mode 1201. A condition for switching collection modes when the condition is satisfied is written as the qualification condition 1202 for each collection mode separately. Examples of switching of collection modes include a shift to a mode in which operation of the communication device is given priority when the CPU utilization rate exceeds 80%. In an operation priority mode, collection of a log that requires a long collection time is suppressed so as not to hinder essential operation of the communication device. The collection mode is switched by the collection mode determination module 901.

Processing executed by the collection mode determination module 901 is described below.

Figure 13:
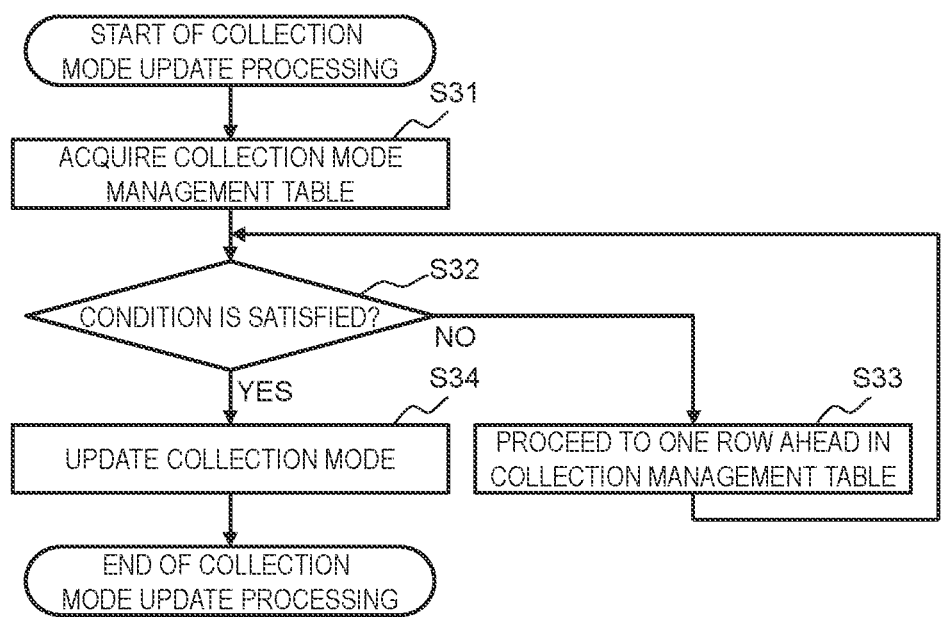
FIG. 13 is a flow chart of collection mode update processing executed by the collection mode determination module according to the second embodiment.

FIG. 13 is a flow chart of collection mode update processing executed by the collection mode determination module 901. The collection mode determination module 901 does not change the current collection mode when updating of a collection mode is not permitted, and, when updating of a collection mode is permitted, executes the collection mode update processing in a fixed cycle.

Step S31: The collection mode management table 1002 is acquired from the management table group 122.

Step S32: One row of the collection mode management table 1002 is referred to, and whether the qualification condition 1202 is satisfied is determined. A row recommended to be referred to immediately after the collection mode management table 1002 is acquired is the top row. When the qualification condition 1202 is satisfied, the process proceeds to Step S34. When the qualification condition 1202 is not satisfied, the process proceeds to Step S33.

Step S33: The next row of the collection mode management table 1002 is referred to, and the process returns to Step S32.

Step S34: The collection mode is changed to the collection mode 1201 determined in Step S32 to be a mode that satisfies the qualification condition 1202.

Processing executed by the failure cause candidate determination module 113 and the additional collection management module 902 in the second embodiment is described below with reference to FIG. 14A and FIG. 14B.

Figure 14A:
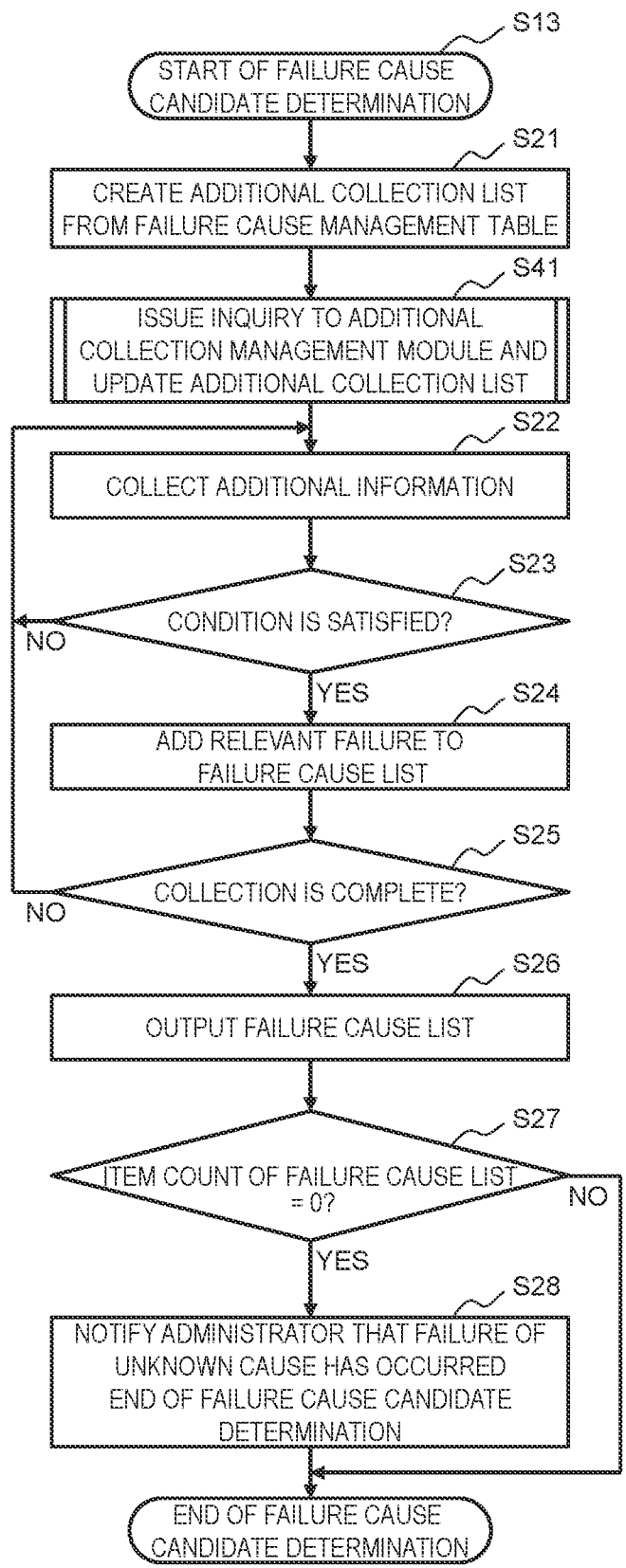
FIG. 14A is a flow chart of failure cause candidate determination processing executed by the failure cause candidate determination module and the additional collection management module according to the second embodiment.
Figure 14B:
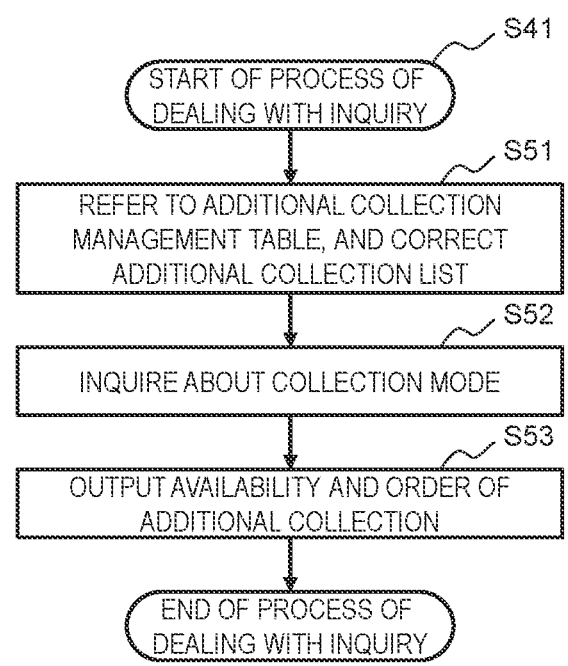
FIG. 14B is a flow chart of an additional collection list updating processing according to the second embodiment.

FIG. 14A is a flow chart of failure cause candidate determination processing executed by the failure cause candidate determination module 113 and the additional collection management module 902 according to the second embodiment. When detecting alert, the failure cause candidate determination module 113 executes the following steps. However, processing steps of from Step S21 to Step S28 are the same as the processing steps in the first embodiment, and descriptions thereof are accordingly omitted.

Step S41: After Step S21, the additional collection list is transmitted to the additional collection management module 902, and an additional collection list in which whether a log is allowed to be collected and the order of collecting logs are taken into consideration is acquired. Step S22 and the subsequent processing steps are then executed.

Next, detailed processing of updating (Step S41) the additional collection list is described with reference to FIG. 14B. For an inquiry issued by the failure cause candidate determination module 113 in Step S41, the additional collection management module 902 executes the following steps of dealing with the inquiry.

Step S51: The additional collection management table 1001 is referred to, and the collection prohibition condition 1104 is determined for each log written on the received additional collection list. Any log that satisfies the collection prohibition condition 1104 is deleted from the additional collection list.

Step S52: An inquiry about the collection mode 1201 is issued to the collection mode determination module 901, and the current collection mode 1201 is acquired in response.

Step S53: The additional collection availability 1103 of the additional collection management table 1001 is referred to, and a log written on the received additional collection list is deleted in accordance with the collectability of each collection mode 1201. The order of collection is then determined by referring to the log information 1102 corresponding to the collection mode 1201, and the order on the additional collection list is reorganized in accordance with the determined order of collection. For example, in the operation priority mode, the length of collection time is referred to, and the order of collection is determined by ascending order of collection time. Lastly, the created additional collection list is transmitted to the failure cause candidate determination module 113.

An additional collection management screen 1500 displayed by the input/output unit 140 when a terminal coupled to the communication device 100 via a network accesses the communication device 100 via a browser, and a condition changing screen 1510 displayed via an interface on the additional collection management screen 1500, are described below. This invention is not to be interpreted as being limited to contents of display and contents of operation on the additional collection management screen 1500 and the condition changing screen 1510 described below.

Figure 15B:
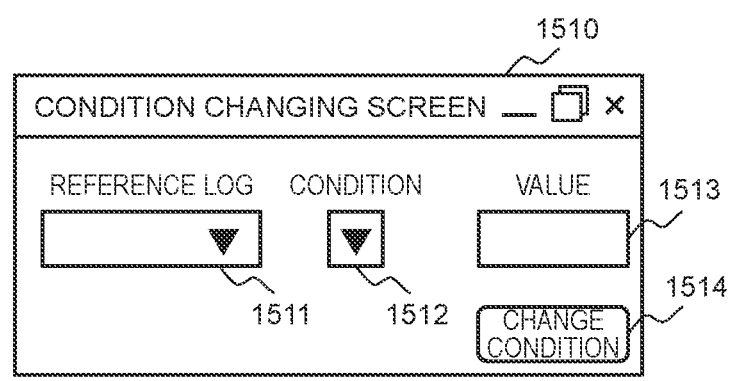
FIG. 15B is a diagram for illustrating an example of the condition changing screen according to the second embodiment.

FIG. 15A is a diagram for illustrating an example of the additional collection management screen 1500 of the communication device. FIG. 15B is a diagram for illustrating an example of the condition changing screen 1510.

The input/out unit 140 refers to the management table group 122 to create the additional collection management screen 1500. The additional collection management screen 1500 displays contents recorded in the additional collection management table 1001 and the collection mode management table 1002.

The contents of the additional collection management table 1001 are displayed as log additional collection availability by associating the items of the table which are the log name 1101, the log information 1102, the additional collection availability 1103, and the collection prohibition condition 1104 with one another. The contents of the collection mode management table 1002 are displayed as a mode automatic change condition by associating the collection mode 1201 and the qualification condition 1202 with each other.

Operation on the additional collection management screen 1500 is described below.

The collection mode 1201 can be selected in a collection mode input field 1501. An item selectable in the collection mode input field 1501 other than the collection mode is an automatic change mode. In the automatic change mode, the collection mode determination module 901 is permitted to update the collection mode and dynamically switches the collection mode 1201 depending on the condition.

The log information 1102 which serves as a basis for determination of the order of collecting logs by the additional collection management module 902 in Step S53 can be determined for each collection mode 1201 separately with the use of a reference information input field 1502. The order of collection is determined by ascending order of reference information. When a descending order checkbox 1503 is checked, the order of collection is determined by descending order of reference information.

A condition changing button 1504 is operated to display the condition changing screen 1510, which is illustrated in FIG. 15B.

A new collection mode 1201 can be defined by inputting a collection mode name in a collection mode input field 1505 on the additional collection management screen 1500 and then operating an enter button 1506.

One new item can be displayed for each of the collection mode input field 1505 and the enter button 1506 by operating a collection mode addition button 1507.

A collectability determination checkbox 1508 is a checkbox for displaying and changing whether collection of a log written in each row is allowed, and when the additional collection availability 1103 of the additional collection management table 1001 is "available" at the time of generation of the additional collection management screen 1500, the displayed checkbox is checked. When the additional collection availability 1103 is "unavailable" at that time, the displayed checkbox is unchecked. The additional collection availability 1103 can be updated to "available" by checking the checkbox on the screen, and to "unavailable" by unchecking the checkbox.

On the condition changing screen 1510, the qualification condition 1202 and the collection prohibition condition 1104 can be changed by selecting the log name 1101 in a reference log input field 1511, selecting a greater-than sign, a less-than sign, an equality sign, an inequality sign, or another condition in a condition input field 1512, inputting a threshold value in a value input field 1513, and then operating a condition change completion button 1514.

When a settings update button 1509 is operated, the input/output unit 140 updates the management table group 122 in accordance with the settings information displayed on the additional collection management screen 1500.

As described above, according to the second embodiment, steps of identifying a cause of a failure that has no possibility of occurring can be removed by setting the collection prohibition condition 1104. In addition, with the collection prohibition condition 1104 and the additional collection availability 1103 which is set for each mode, measures of failure cause identification that are suited to requirements demanded of the communication device by a user can be provided. For example, when the communication device 100 is used to transmit and receive control information of industrial equipment, a cause of a failure is required to be identified without hindering communication of the control information. In such cases, suspension of log collection that consumes a large quantity of resources of the communication device 100, identification of a cause based on log collection that requires only light processing, and other functions can be provided in a manner that allows switching between the functions. In addition, measures of failure cause identification that satisfy hourly changing requirements demanded by a user can be provided by dynamically switching the collection mode 1201. For example, an operation priority mode which suppresses resource consumption and is accordingly suitable for use during working hours in which the communication device and equipment coupled to the communication device actively operate and a resource utilization rate is high, detailed identification of a cause of a failure for non-working hours when the resource utilization rate is low, and other functions can be provided.

The additional collection conditions and mode change conditions are managed here in tables for the purpose of description. However, the conditions may be held within software, and effects of the second embodiment can be obtained regardless of management measures of the conditions.

Third Embodiment

In a third embodiment of this invention, a failure cause identification system including a surveillance server 1600 in addition to a plurality of communication devices 100 is provided. The surveillance server 1600 refers to logs and alert collected from the plurality of communication devices 100 to determine candidates for a cause of a failure, and updates log collection conditions and alert conditions of the plurality of communication devices to conditions appropriate for the determined failure cause candidates. The following description of the third embodiment is centered around differences from the first embodiment. In the third embodiment, components and functions that are the same as those in the first embodiment are denoted by the same reference symbols, and descriptions thereof are omitted.

Figure 16:
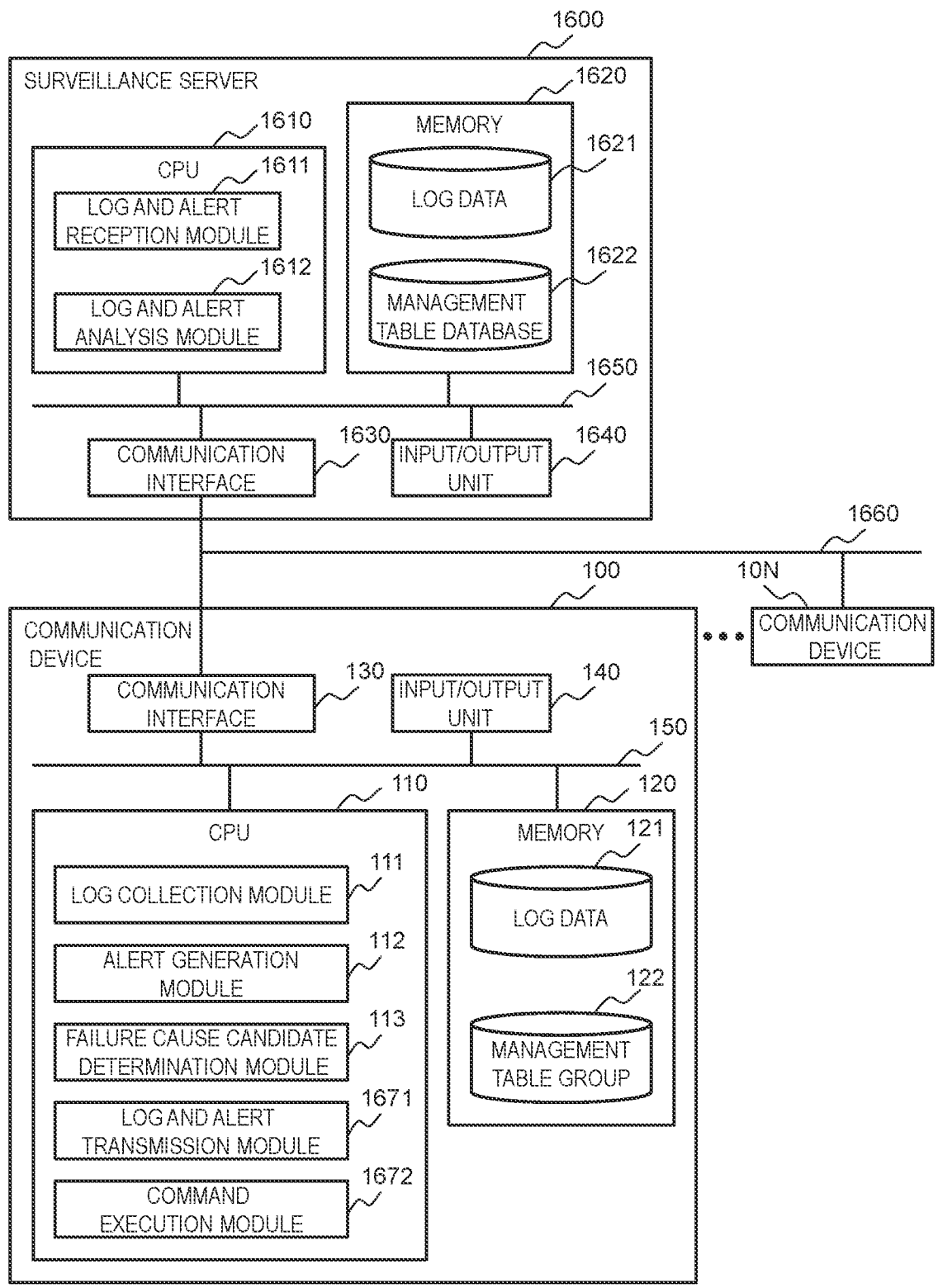
FIG. 16 is a diagram for illustrating an example of a configuration of the failure cause identification system according to a third embodiment.

FIG. 16 is a diagram for illustrating an example of a configuration of the failure cause identification system according to the third embodiment.

The failure cause identification system includes the surveillance server 1600 and a plurality of communication devices 100 to 10N.

The surveillance server 1600 includes a CPU 1610, a memory 1620, a communication interface 1630, and an input/output unit 1640, and those components are coupled to one another via an intra-surveillance server network 1650. The intra-surveillance server network 1650 is not limited to the type and coupling method thereof, and a network of a different type and a different coupling method may couple the components to one another.

The CPU 1610 is an arithmetic device which executes programs and, by executing programs, operates as function modules which implement specific functions (a log and alert reception module 1611, and a log and alert analysis module 1612).

Some of processing executed by the CPU 1610 by executing the programs may be executed by another arithmetic device (for example, hardware such as a field-programmable gate array (FPGA) or an application-specific integrated circuit (ASIC)). In the following description, processing described with a function module as the subject of a sentence is executed by the CPU 1610 by executing a program that implements this function module.

The memory 1620 stores log data 1621 collected from each of the communication devices 100 to 10N, and a management table database 1622 in which the management table group 122 included in each of the communication devices 100 to 10N is stored for each communication device.

A program executed by the CPU 1610 is introduced to the surveillance server 1600 via a removable medium (a CD-ROM, a flash memory, or the like) or a network, and is stored in a non-volatile auxiliary storage device (not shown), which is a non-transitory storage medium. It is accordingly recommended for the surveillance server 1600 to include an interface for reading data from a removable medium.

The surveillance server 1600 is a computer system configured on a single computer or on a plurality of logically or physically configured computers, and may operate on the same computer in different threads, or on a virtual computer built from a plurality of physical computer resources.

The communication devices 100 to 10N according to the third embodiment each include the CPU 110, the memory 120, the communication interface 130, and the input/output unit 140.

The CPU 110 is an arithmetic device which executes programs and, by executing programs, operates as function modules which implement specific functions (a log and alert transmission module 1671, and a command execution module 1672).

Some of processing executed by the CPU 110 by executing the programs may be executed by another arithmetic device (for example, hardware such as a field-programmable gate array (FPGA) or an application-specific integrated circuit (ASIC)). In the following description, processing described with a function module as the subject of a sentence is executed by the CPU 110 by executing a program that implements this function module.

The surveillance server 1600 and the plurality of communication devices 100 to 10N are coupled to one another via a network 1660. The network 1660 is not limited to the type and coupling method thereof, and a network of a different type and a different coupling method may couple the devices to one another.

Figure 17:
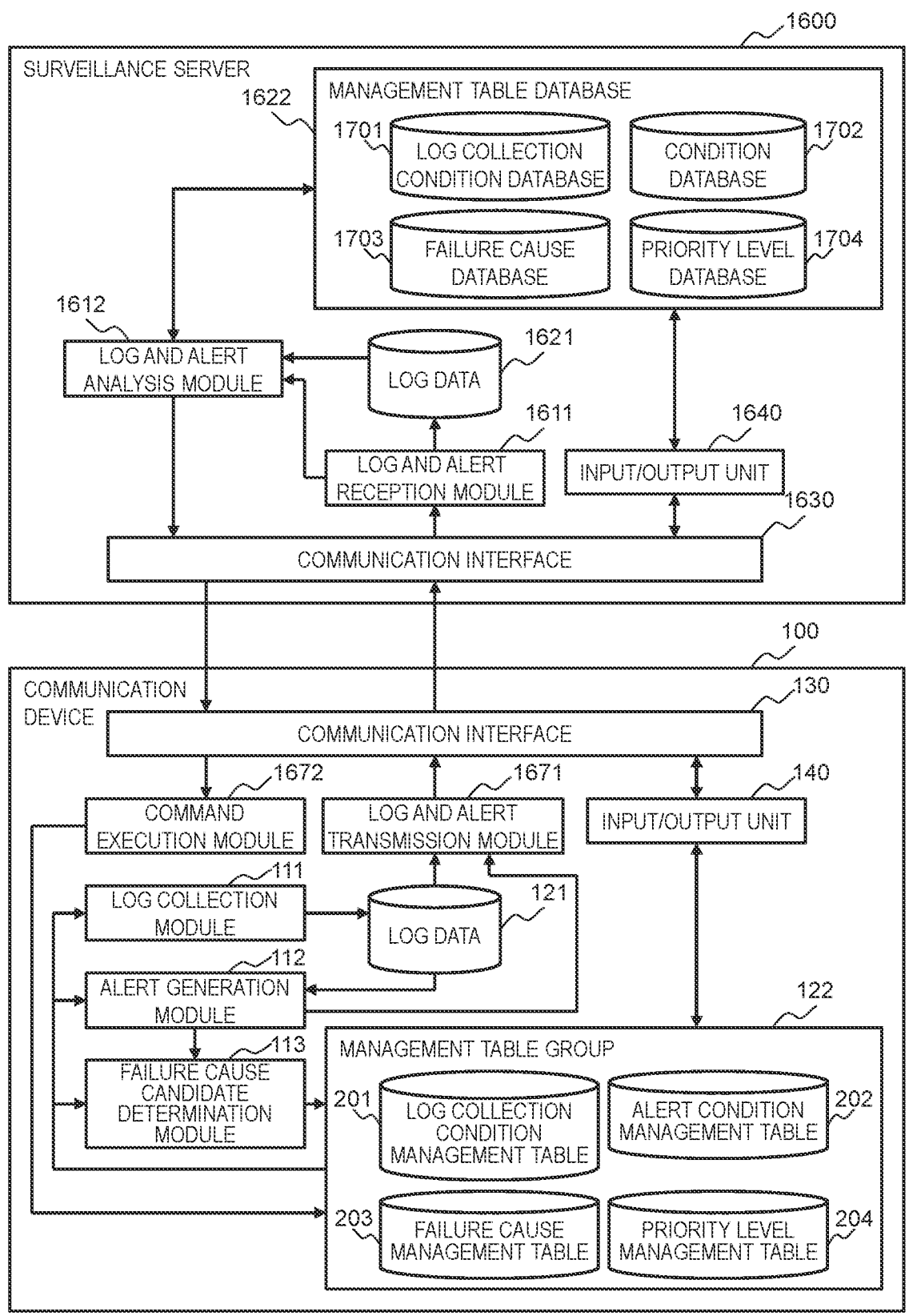
FIG. 17 is a diagram for illustrating an example of input/output among the components of the failure cause identification system according to the third embodiment.

FIG. 17 is a diagram for illustrating an example of input/output among the components of the failure cause identification system according to the third embodiment.

Input/output and a configuration of the surveillance server 1600 are described below.

The management table database 1622 includes a log collection condition database 1701, an alert condition database 1702, a failure cause database 1703, and a priority level database 1704.

The log collection condition database 1701 stores the same contents as the contents of the log collection condition management table 201, in association with each of the communication devices 100 to 10N. The alert condition database 1702 stores the same contents as the contents of the alert condition management table 202 in association with each of the communication devices 100 to 10N. The failure cause database 1703 stores the same contents as the contents of the failure cause management table 203 in association with each of the communication devices 100 to 10N. The priority level database 1704 stores the same contents as the contents of the priority level management table 204 in association with each of the communication devices 100 to 10N.

The log and alert reception module 1611 receives logs and alert from the communication devices 100 to 10N via the communication interface 1630, stores the received logs in the log data 1621, and notifies the received alert to the log and alert analysis module 1612.

The log and alert analysis module 1612 analyzes the logs and the alert received from the communication devices 100 to 10N. As a result of the analysis, the log and alert analysis module 1612 extracts a table update instruction, transmits the extracted table update instruction to the management table database 1622, and transmits the extracted table update instruction to the communication devices 100 to 10N via the communication interface 1630. The analysis of the log and the alert here is, for example, analysis of a cause of a failure in which alert and logs of the plurality of communication devices 100 to 10N are referred to.

The input/output unit 1640 receives a table update notification and input from the outside via the communication interface 1630, and updates the management table database 1622. The input/output unit 1640 also transmits, when detecting an instruction to update the management table group 122 of one of the communication devices 100 to 10N, a table update notification to the one of the communication devices 100 to 10N via the communication interface 1630.

The failure cause database 1703 and the priority level database 1704 store a failure cause management table 203 for multiple-communication device reference and a priority management table 204 for multiple-communication device reference, respectively, which are included only in the surveillance server 1600. When alert is notified from multiple communication devices out of the plurality of communication devices 100 to 10N, the log and alert analysis module 1612 refers to the failure cause management table 203 for multiple-communication device reference and the priority level management table 204 for multiple-communication device reference in order to determine failure cause candidates.

Differences from the first embodiment in terms of input/output and a configuration of the communication devices 100 to 10N are described below.

The log and alert transmission module 1671 transmits a log collected by the log collection module 111 and alert generated by the alert generation module 112 to the surveillance server 1600 via the communication interface 130.

The command execution module 1672 executes a command received from the surveillance server 1600 via the communication interface 130.

The input/output unit 140 transmits, when detecting update of the management table group 122, a table update notification to the surveillance server 1600 via the communication interface 130. The input/output unit 140 also receives a table update notification via the communication interface 130, and updates the management table group 122.

Processing executed by the log and alert analysis module 1612 in the third embodiment is described below.

Figure 18:
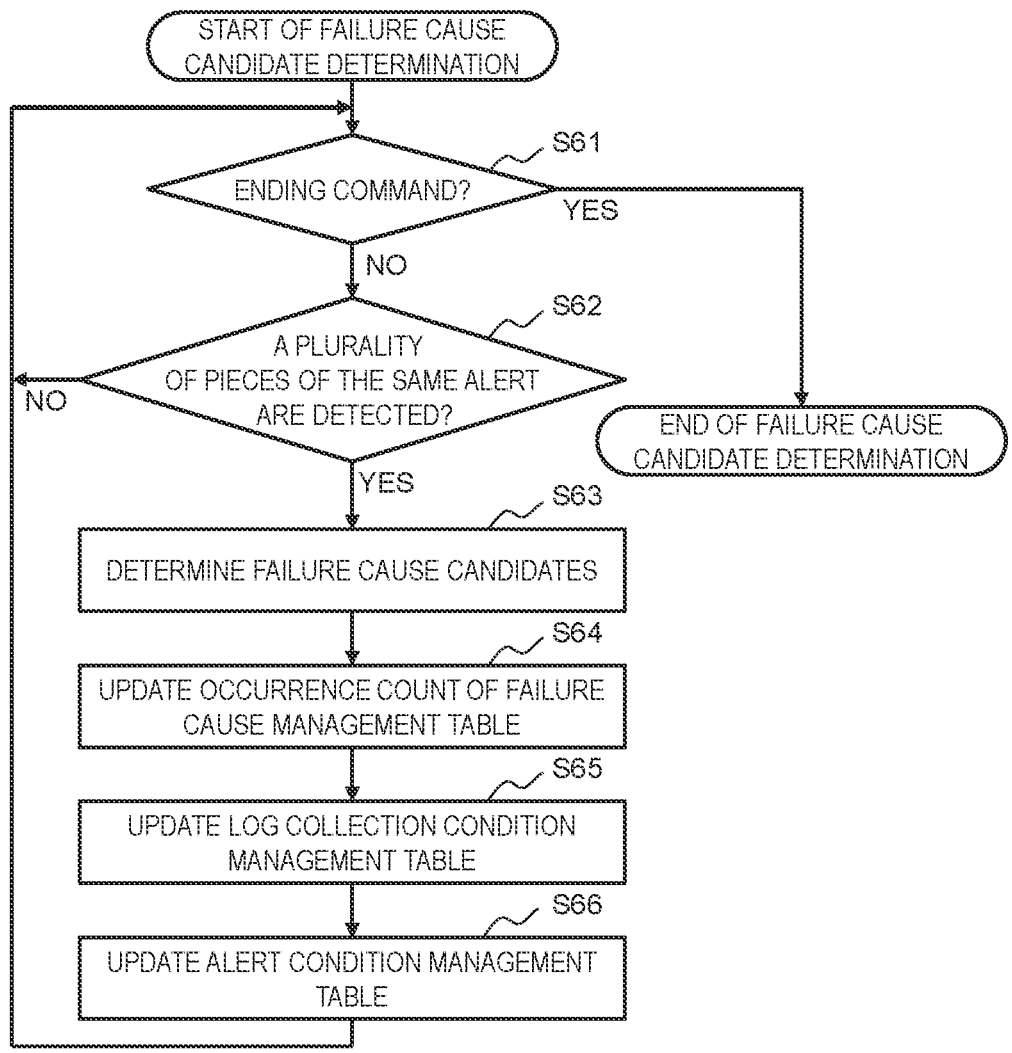
FIG. 18 is a flow chart of failure cause candidate determination processing executed by the log and alert analysis module according to the third embodiment.

FIG. 18 is a flow chart of failure cause candidate determination processing executed by the log and alert analysis module 1612 according to the third embodiment. Once starting operation, the log and alert analysis module 1612 executes the following steps.

Step S61: Whether an ending instruction has been input by the input/output unit 1640 is determined. When it is determined that an ending instruction has been input, the operation ends. When it is determined that an ending instruction has not been input, the process proceeds to Step S62.

Step S62: Whether the log and alert reception module 1611 has received alert is determined and, in a case in which the same alert is received from multiple communication devices out of the plurality of communication devices 100 to 10N, the process proceeds to Step S63. In a case in which the same alert from multiple communication devices out of the plurality of communication devices 100 to 10N has not been received, the process returns to Step S61.

Step S63: The failure cause management table 203 for multiple-communication device reference and the priority management table 204 for multiple-communication device reference which are included only in the surveillance server 1600 are referred to, a log of every communication device that has transmitted the alert is referred to, and failure cause candidate determination processing is executed. To determine failure cause candidates, processing steps of from Step S21 to Step S28 are executed as is the case for the communication device 100 of the first embodiment.

Step S64: In each of rows of the failure cause management table 203 for multiple-communication device reference that hold the failure cause candidates determined in Step S63, 1 is added to the value of the occurrence count 504.

Step S65: The log collection condition database 1701 is referred to, and information of a log related to one of the determined failure cause candidates is updated in the log collection condition management table 201 of each of the communication devices for which the failure cause candidates have been determined in Step S63. For example, in a row of the log collection condition management table 201 in which the log name 302 matches the collected log 505 in a row of the failure cause management table 203 that holds the failure cause 502 determined to be a candidate, table update processing in which the collection cycle 303 is changed to a minimum time and the collection flag 304 is changed from 0 to 1 when the collection flag 304 is 0 is executed.

Step S66: The alert condition database 1702 is referred to, and information of alert related to one of the determined failure cause candidates is updated in the alert condition management table 202 of each of the communication devices for which the failure cause candidates have been determined in Step S63. For example, in a row of the alert condition management table 202 in which the alert name 402 matches the alert name 501 in a row of the failure cause 502 determined to be a candidate, the check cycle 405 is changed to a minimum time.

The following description is about operation on a screen displayed by the input/output unit 1640 when a terminal coupled to the surveillance server 1600 via a network accesses the surveillance server 1600 via a browser.

The input/output unit 1640 displays the same settings information management screen 800 as the settings information management screen 800 in the first embodiment. The settings information management screen 800 here is recommended to be designed so that a communication device for which settings are displayed or updated out of the communication devices 100 to 10N is switched by changing a uniform resource locater (URL) referred to by the browser.

The same operation as the one in the first embodiment is performed on the screen, and a description thereof is accordingly omitted.

After the settings are updated by screen operation, the input/output unit 1640 updates the management table database 1622 and transmits, via the communication interface 1630, a table update notification to each communication device out of the communication devices 100 to 10N that has been referred to.

As described above, according to the third embodiment, a failure cause undetectable with a single communication device alone can be detected by referring to logs and alert aggregated in the surveillance server 1600. For example, when an error rate rises in wireless communication sections of multiple communication devices out of the plurality of communication devices 100 to 10N, there may be an interference wave being generated nearby. It is difficult with a single communication device alone to determine whether the cause of the rise in error rate is a problem unique to the communication device, such as a trouble with an antenna, or an interference wave affecting a plurality of communication devices. With the failure cause identification system in the third embodiment, on the other hand, the interference wave can be identified as the cause by referring to alert about a rise in error rate of multiple communication devices.

In addition, according to the third embodiment, a priority level can be determined for identification of failure cause candidates that refers to multiple communication devices. A problem suspected to originate from hardware or software by a single communication device that executes identification alone is often caused by a trouble related to wireless communication or a network when the same alert is generated in multiple communication devices out of the plurality of communication devices 100 to 10N. Accordingly, when failure cause candidates are determined by referring to multiple communication devices, failure cause candidates related to networks can preferentially be determined, with the result that highly efficient determination of failure cause candidates is accomplished.

In the third embodiment, detection of a plurality of pieces of the same alert in Step S62 is used as a start point of failure cause candidate determination for the purpose of description. However, the effects of the third embodiment can be similarly obtained irrespective of what condition is used as the start point. For example, condition examination operation for referring to the log information 1102 of the communication devices 100 to 10N may be defined on the surveillance server 1600 to execute determination of failure cause candidates for some of the communication devices 100 to 10N that satisfy the condition.

Fourth Embodiment

In a fourth embodiment of this invention, the processing executed on the communication device 100 in the first embodiment is executed on the surveillance server 1600. The following description of the fourth embodiment is centered around differences from the first to third embodiments. In the fourth embodiment, components and functions that are the same as those in the above-mentioned embodiments are denoted by the same reference symbols, and descriptions thereof are omitted.

Figure 19:
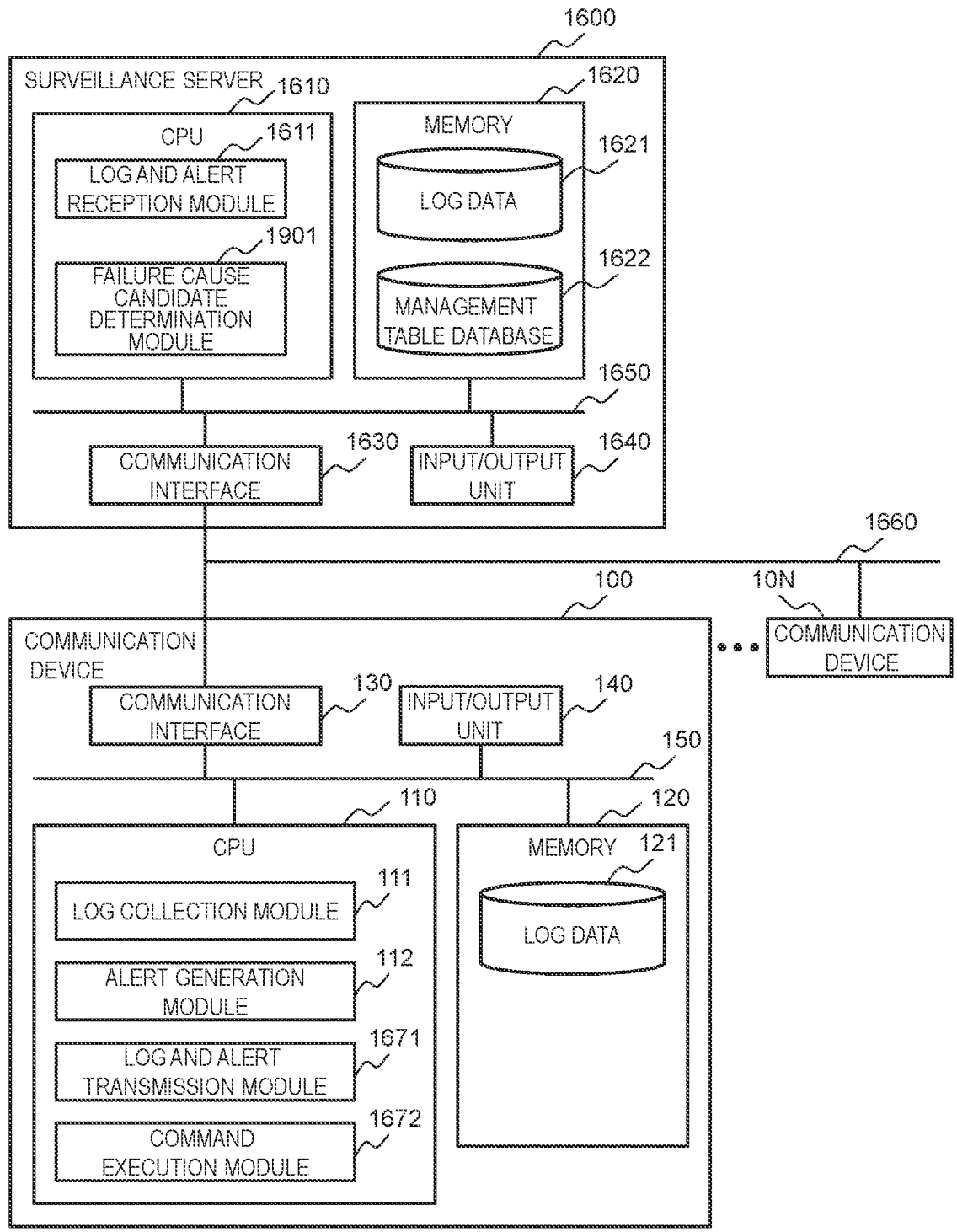
FIG. 19 is a diagram for illustrating an example of a configuration of a failure cause identification system according to a fourth embodiment.

FIG. 19 is a diagram for illustrating an example of a configuration of a failure cause identification system according to the fourth embodiment.

The failure cause identification system includes the surveillance server 1600 and the plurality of communication devices 100 to 10N.

The surveillance server 1600 and the communication devices 100 to 10N have the same components as the components in the third embodiment.

The CPU 1610 is an arithmetic device which executes programs. The CPU 1610 operates as function modules which implement specific functions (the log and alert reception module 1611 and a failure cause candidate determination module 1901), by executing programs. Uses and operation of the log and alert reception module 1611 are the same as in the third embodiment, and descriptions thereof are accordingly omitted.

The CPU 110 is an arithmetic device which executes programs. The CPU 110 operates as function modules which implement specific functions (the log collection module 111, the alert generation module 112, the log and alert transmission module 1671, and the command execution module 1672), by executing programs. In the following description, processing described with a function module as the subject of a sentence is executed by the CPU 110 by executing a program that implements this function module.

Uses and operation of the log collection module 111 and the alert generation module 112 are the same as in the first embodiment, and uses and operation of the log and alert transmission module 1671 and the command execution module 1672 are the same as in the third embodiment. Descriptions of the uses and the operation are accordingly omitted.

Figure 20:
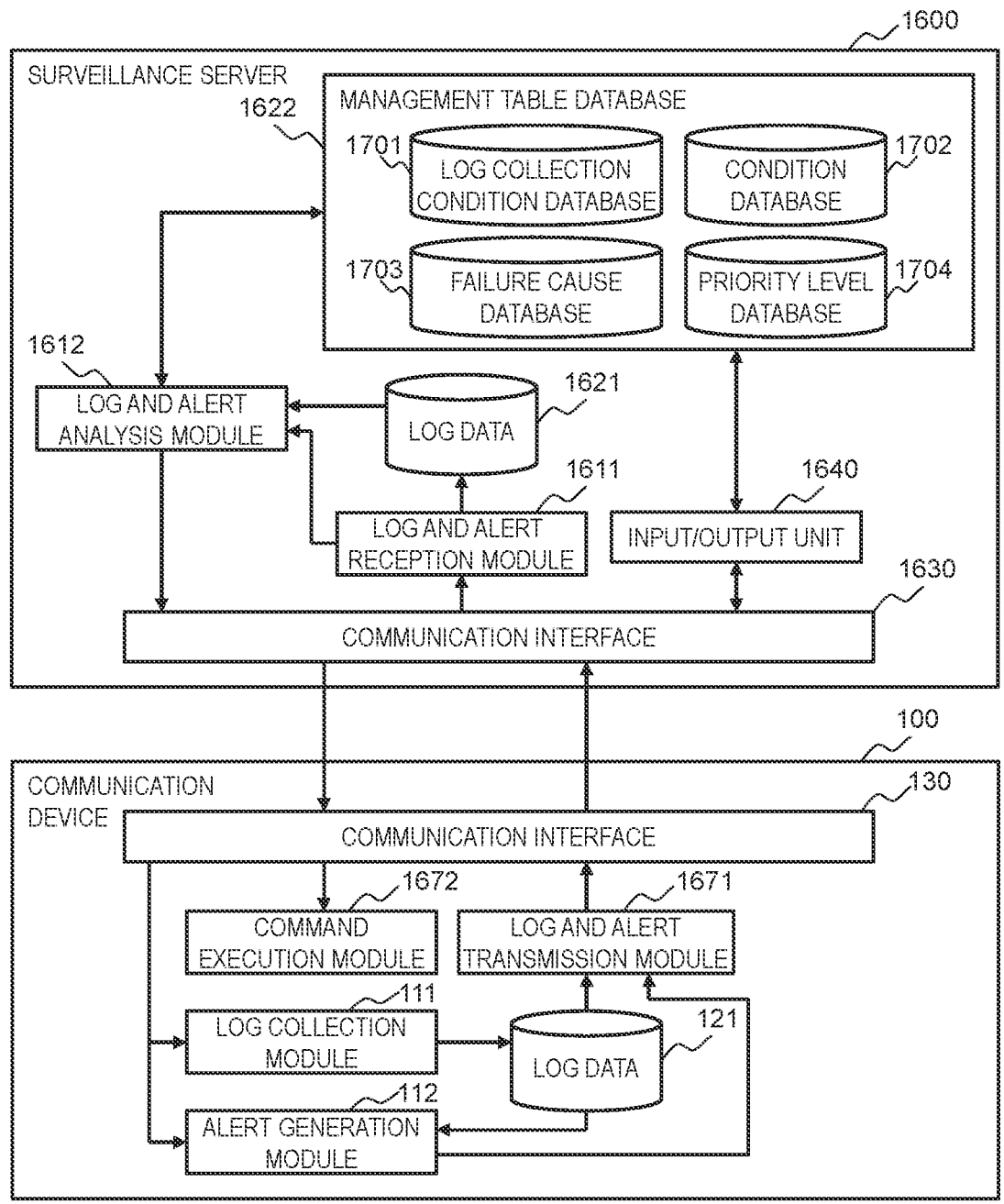
FIG. 20 is a diagram for illustrating an example of input/output among the components of the failure cause identification system according to the fourth embodiment.

FIG. 20 is a diagram for illustrating an example of input/output among the components of the failure cause identification system according to the fourth embodiment.

The following description is centered around differences from the first embodiment and from the third embodiment.

The failure cause candidate determination module 1901 receives an alert notification from the log and alert reception module 1611, and refers to the failure cause database 1703 and the priority level database 1704 to determine failure cause candidates. In order to determine failure cause candidates, the failure cause candidate determination module 1901 instructs, via the communication interface 1630, the communication devices 100 to 10N to additionally collect logs. The failure cause candidate determination module 1901 further updates the log collection condition database 1701, the alert condition database 1702, and the failure cause database 1703, based on failure causes determined to be candidates.

The input/output unit 1640 refers to the log collection condition database 1701 and the alert condition database 1702 to transmit a log collection condition and an alert condition to the communication devices 100 to 10N via the communication interface 1630.

The log collection module 111 and the alert generation module 112 collects logs and generates alert under the log collection condition and the alert condition received via the communication interface 130.

Processing executed by the failure cause candidate determination module 1901 in the fourth embodiment is described below.

The failure cause candidate determination module 1901 executes the same processing that is executed by the failure cause candidate determination module 113 in the first embodiment. In this processing, the management table group 122 of each communication device out of the communication devices 100 to 10N that has generated alert is referred to from the management table database 1622.

As described above, according to the fourth embodiment, failure cause identification measures reduced in the quantity of resources of the communication devices 100 to 10N required to determine failure cause candidates can be provided by consolidating the functions of the communication devices 100 to 10N in the surveillance server 1600. For example, in a case in which the communication devices 100 to 10N are used to transmit and receive control information of industrial equipment, a cause of a failure is required to be identified without hindering communication of the control information. When the failure cause candidate determination processing is executed in parallel, the resource utilization rate of the communication devices 100 to 10N may rise to a point at which communication of the control information is hindered. The possibility of failed communication of control information can be reduced by executing the failure cause candidate determination processing on the surveillance server 1600, executing additional log collection in the communication devices 100 to 10N, and thus suppressing the quantity of resources used as in the fourth embodiment.

Fifth Embodiment

In a fifth embodiment of this invention, in addition to the processing in the fourth embodiment, the processing executed on the communication device 100 in the second embodiment is executed on the surveillance server 1600. The following description of the fifth embodiment is centered around differences from the first to third embodiments. In the fifth embodiment, components and functions that are the same as those in the above-mentioned embodiments are denoted by the same reference symbols, and descriptions thereof are omitted.

Figure 21:
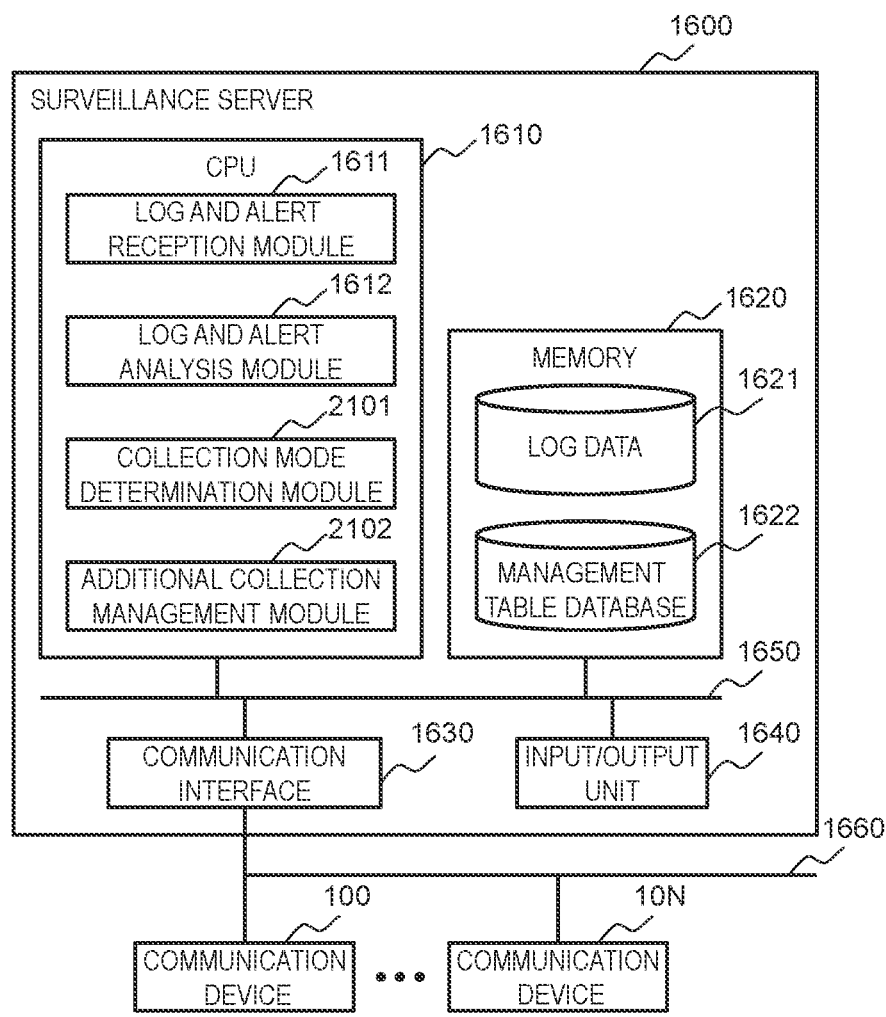
FIG. 21 is a diagram for illustrating an example of a configuration of a failure cause identification system according to a fifth embodiment.

FIG. 21 is a diagram for illustrating an example of a configuration of a failure cause identification system according to the fifth embodiment.

The failure cause identification system includes the surveillance server 1600 and the plurality of communication devices 100 to 10N.

The surveillance server 1600 and the communication devices 100 to 10N have the same components as the components in the fourth embodiment.

The CPU 1610 is an arithmetic device which executes programs. The CPU 1610 operates as function modules which implement specific functions (a collection mode determination module 2101 and an additional collection management module 2102), by executing programs. Uses and operation of the log and alert reception module 1611 are the same as in the third embodiment, and descriptions thereof are accordingly omitted.

Operation and input/output of the function modules other than the collection mode determination module 2101 and the additional collection management module 2102 are the same as in the fourth embodiment, and descriptions thereof are accordingly omitted.

Figure 22:
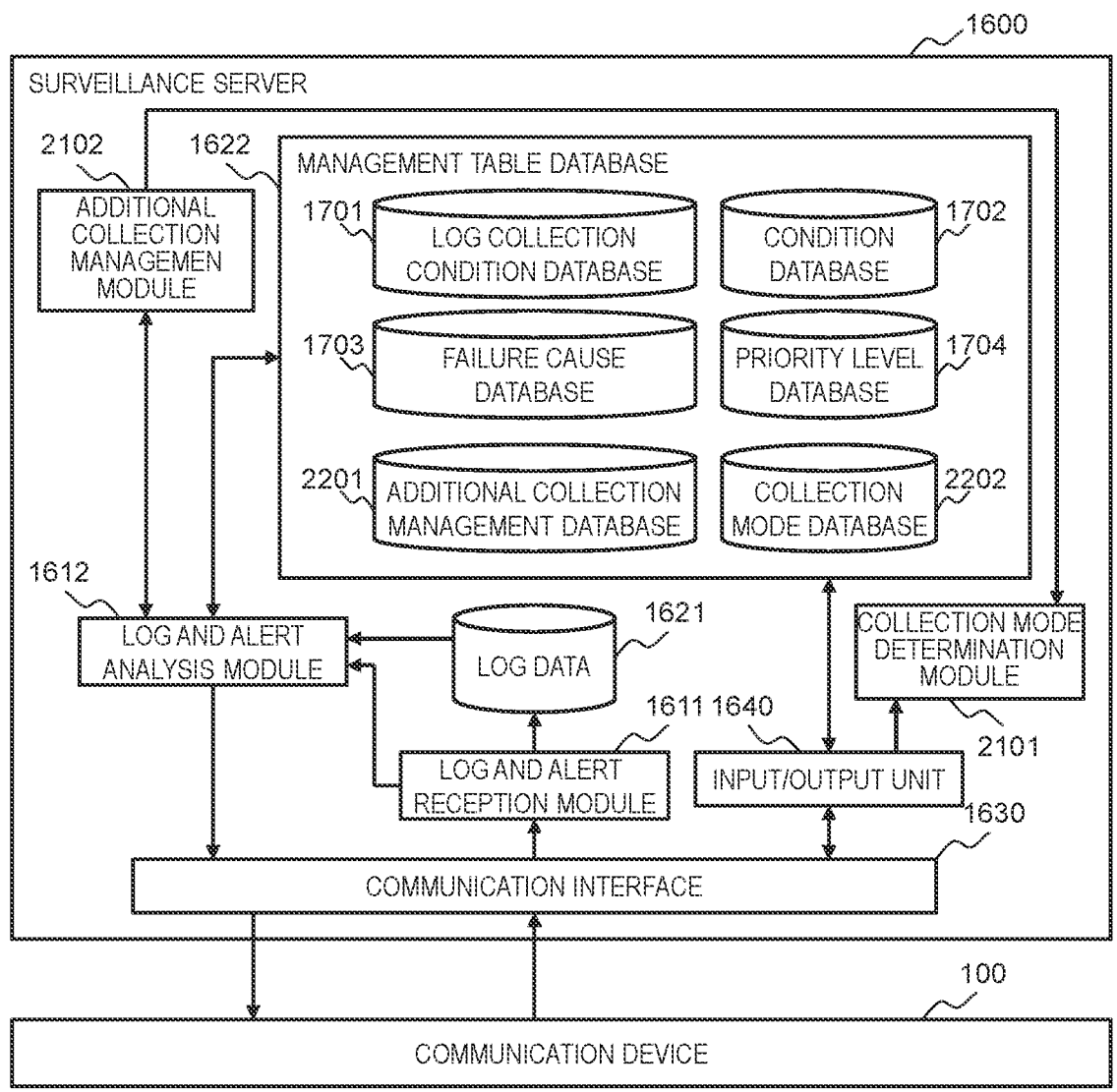
FIG. 22 is a diagram for illustrating an example of input/output among the components of the failure cause identification system according to the fifth embodiment.

FIG. 22 is a diagram for illustrating an example of input/output among the components of the failure cause identification system according to the fifth embodiment.

The management table database 1622 includes an additional collection management database 2201 and a collection mode database 2202.

The additional collection management database 2201 stores the additional collection management table 1001. The collection mode database 2202 stores the same contents as the contents of the collection mode management table 1002, by associating each collection mode management table 1002 with one of the communication devices 100 to 10N.

The collection mode determination module 2101 determines the collection mode 1201 which determines a trend of collection in identification of failure cause candidates. The collection mode 1201 is determined with the use of input received from the communication interface 1630 via the input/output unit 1640, or the qualification condition 1202 written for each collection mode in the collection mode management table 1002 stored in the collection mode database 2202.

The additional collection management module 2102 responds to an inquiry issued by the failure cause candidate determination module 1901 in identification of failure cause candidates, by referring to log collectability and the order of log collection, as well as the collection prohibition condition 1104, of the additional collection management table 1001 stored in the additional collection management database 2201, and returning a corrected additional collection list. To deal with the inquiry, the additional collection management module 2102 issues an inquiry about the collection mode 1201 to the collection mode determination module 2101.

The collection mode determination module 2101 executes the same processing that is executed by the collection mode determination module 901 in the second embodiment.

Processing executed by the failure cause candidate determination module 1901 and the additional collection management module 2102 in the fifth embodiment is described below. In the processing, the collection mode management table 1002 of each communication device out of the communication devices 100 to 10N for which the collection mode 1201 is determined is referred to from the management table database 1622.

The failure cause candidate determination module 1901 executes the same processing that is executed by the failure cause candidate determination module 113 in the second embodiment. In the processing, the management table group 122 of each communication device that has generated alert is referred to from the management table database 1622.

The additional collection management module 2102 executes the same processing that is executed by the additional collection management module 902 in the second embodiment. In the processing, the additional collection management table 1001 of each communication device out of the communication devices 100 to 10N that has generated alert is referred to from the management table database 1622.

According to the fifth embodiment, in addition to the effects of the fourth embodiment, steps of identifying a cause of a failure that has no possibility of occurring can be eliminated by setting the collection prohibition condition 1104. With the collection prohibition condition 1104 and the additional collection availability 1103 which is set for each mode, measures of failure cause identification that are suited to requirements demanded of the communication devices 100 to 10N by users can be provided. Further, a cause of a failure can be identified in a manner that satisfies hourly changing requirements demanded by users, by dynamically switching the collection mode 1201.

As described above, the communication device 100 according to the embodiments of this invention includes the log collection module 111 which collects first type logs from at least one of the communication device 100 or an equipment coupled to the communication device 100, the alert generation module 112 which generates alert when one of the collected first type logs satisfies a predetermined condition, and the failure cause candidate determination module 113 which determines failure cause candidates in response to the generated alert, and which outputs, to the log collection module 111, an additional log collection request for collecting second type logs in an additional log collection order that is set based on the failure causes determined to be candidates. Log collection that accomplishes, when a failure occurs, highly efficient failure cause identification with downtime minimized is thus enabled.

In addition, the failure cause candidate determination module 113 identifies failure cause candidates by determining whether the second type logs collected as requested in the additional log collection request satisfy predetermined conditions. A cause of a failure can accordingly be identified with accuracy and speed.

The failure cause candidate determination module 113 determines the additional log collection order based on a failure cause determined to be a candidate. Logs can accordingly be collected in an order suitable for system requirements.

The failure cause candidate determination module 113 determines the additional log collection order based on information about past failures. A failure that frequently occurs can accordingly be detected early.

The communication device 100 also includes the input/output unit 140 which receives input information. In accordance with the input information, the communication device 100 changes operation and updates settings information of components. A log collection condition and an alert condition can accordingly be set by input from the outside.

The failure cause candidate determination module 113 instructs the log collection module 111 to update the collection condition of a log related a failure cause determined to be a candidate, and the log collection module 111 updates the collection condition of the log following the instruction from the failure cause candidate determination module 113. Log collection can thus be suited to a situation of occurrence of a failure. For example, a failure situation can accurately be grasped by shortening an interval of log collection.

The failure cause candidate determination module 113 instructs the alert generation module 112 to update a condition for generating alert that is related to a failure cause determined to be a candidate, and the alert generation module 112 updates the condition for generating the alert following the instruction from the failure cause candidate determination module 113. Alert can thus be generated in a manner appropriate for the situation of occurrence of a failure. For example, by shortening an alert cycle, timing of failure detection is advanced and a failure can quickly be detected.

The communication device 100 also includes the collection mode determination module 901 which determines a collection mode in accordance with the input information, and the additional collection management module 902 which manages information about additional log collection for each determined collection mode, and the failure cause candidate determination module 113 determines the additional log collection order and the additional log collection availability in accordance with the information from the additional collection management module 902. Failure detection suitable for system requirements is thus accomplished.

The collection mode determination module 901 changes the collection mode when a collection mode switching condition is satisfied. Logs can accordingly be collected without hindering actual running of the system.

When outputting the additional log collection request, the failure cause candidate determination module 113 requests not to collect logs that satisfy a predetermined condition as specified in the additional collection management module 902. Logs can accordingly be collected without inhibiting essential operation. The communication device 100 also includes the log and alert transmission module 1671 which transmits collected logs and generated alert to the surveillance server 1600, and the command execution module 1672 which executes a command received from the surveillance server 1600. The surveillance server 1600 receives logs and alert from the communication device 100, narrows down failure causes by referring to the logs and the alert of one or a plurality of communication devices 100, and instructs the one or plurality of communication devices 100 to change settings information. Failure cause candidates can accordingly be determined with ease and accuracy by using information about the number of communication devices experiencing a failure. This also provides a chance to quickly deal with a failure because a failure occurring in multiple communication devices is to be given importance.

The surveillance server 1600 according to the embodiments of this invention includes the log and alert reception module 1611 which receives alert that is generated based on the first type logs acquired by the communication device 100, and the failure cause candidate determination module 1901 which determines failure cause candidates in response to the generated alert, and which outputs, to the communication device 100, an additional log collection request for collecting second type logs in an additional log collection order that is set based on the failure causes determined to be candidates. Log collection that accomplishes, when a failure occurs, highly efficient failure cause identification with downtime minimized is thus enabled. In addition, a cause of a failure can be identified without pressing on resources of the communication device 100.

This invention is not limited to the above-described embodiments but includes various modifications. The above-described embodiments are explained in details for better understanding of this invention and are not limited to those including all the configurations described above. A part of the configuration of one embodiment may be replaced with that of another embodiment; the configuration of one embodiment may be incorporated to the configuration of another embodiment. A part of the configuration of each embodiment may be added, deleted, or replaced by that of a different configuration.

The above-described configurations, functions, processing modules, and processing means, for all or a part of them, may be implemented by hardware: for example, by designing an integrated circuit, and may be implemented by software, which means that a processor interprets and executes programs providing the functions.

The information of programs, tables, and files to implement the functions may be stored in a storage device such as a memory, a hard disk drive, or an SSD (a Solid State Drive), or a storage medium such as an IC card, or an SD card.

The drawings illustrate control lines and information lines as considered necessary for explanation but do not illustrate all control lines or information lines in the products. It can be considered that almost of all components are actually interconnected.

What is claimed is:

1. A communication device which transfers a signal, comprising:
   an arithmetic device configured to execute predetermined processing;
   a storage device accessible from the arithmetic device;
   a log collection module configured to collect first type logs from at least one of the communication device or an equipment coupled to the communication device;
   an alert generation module configured to generate alert when one of the first type logs satisfies a predetermined condition; and
   a failure cause candidate determination module configured to determine failure cause candidates in response to the generated alert, and output, to the log collection module, an additional log collection request for collecting second type logs in an additional log collection order that is set based on a priority level of failure types of the determined failure cause candidates;
   wherein the failure types include at least two of hardware, software, wireless, and erroneous settings, and each of the failure types has a different priority level.

2. The communication device according to claim 1, wherein the failure cause candidate determination module is configured to identify a failure cause by determining whether the second type logs collected as requested in the additional log collection request satisfy predetermined conditions.

3. The communication device according to claim 1, wherein the failure cause candidate determination module is configured to determine the additional log collection order based on information about past failures.

4. The communication device according to claim 1, further comprising an input/output unit configured to receive input information,
   wherein the communication device is configured to change operation and update settings information of components in accordance with the input information.

5. The communication device according to claim 1, wherein the failure cause candidate determination module is configured to instruct the log collection module to update collection conditions of logs related to the determined failure cause candidates, and
   wherein the log collection module is configured to update the collection conditions of the logs following the instruction from the failure cause candidate determination module.

6. The communication device according to claim 1, wherein the failure cause candidate determination module is configured to instruct the alert generation module to update a generation condition of alert related to the determined failure cause candidates, and
   wherein the alert generation module is configured to update the generation condition of the alert following the instruction from the failure cause candidate determination module.

7. The communication device according to claim 4, further comprising:
   a collection mode determination module configured to determine a collection mode in accordance with the input information; and
   an additional collection management module configured to manage information about additional log collection for each determined collection mode,
   wherein the failure cause candidate determination module is configured to determine the additional log collection order and an availability of the additional log collection in accordance with the information from the additional collection management module.

8. The communication device according to claim 7, wherein the collection mode determination module is configured to change the collection mode when a collection mode switching condition is satisfied.

9. The communication device according to claim 1, further comprising an additional collection management module configured to manage a collection prohibition condition of a log,
   wherein, when the failure cause candidate determination module outputs the additional log collection request, the failure cause candidate determination module is configured to request to avoid collecting a log that satisfies a predetermined condition as specified in the additional collection management module.

10. The communication device according to claim 1, wherein the communication device is coupled to a surveillance server configured to issue, to the communication device, a command to change settings information, and
    wherein the communication device further comprises:
    a log and alert transmission module configured to transmit the collected logs and the generated alert to the surveillance server; and
    a command execution module configured to execute the command received from the surveillance server.

11. A log collection method for use in a communication system including a communication device which transfers a signal,
    the communication device including an arithmetic device configured to execute predetermined processing, and a storage device accessible to the arithmetic device,
    the log collection method comprising:
    a log collection step of collecting, by the arithmetic device, first type logs from at least one of the communication device or equipment coupled to the communication device;
    an alert generation step of generating, by the arithmetic device, alert when one of the collected first type logs satisfies a predetermined condition; and a failure cause candidate determination step of determining, by the arithmetic device, failure cause candidates in response to the generated alert, and outputting an additional log collection request for collecting second type logs in an additional log collection order that is set based on a priority level of failure types of the determined failure cause candidates;

wherein the failure types include at least two of hardware, software, wireless, and erroneous settings, and each of the failure types has a different priority level.

* * * * *